US012622450B2

(12) United States Patent
Seo et al.

(10) Patent No.: US 12,622,450 B2
(45) Date of Patent: May 12, 2026

(54) METHOD FOR PRODUCING FERMENTED SHIITAKE MUSHROOM SAUCE USING LACTIC ACID BACTERIA FERMENTED PRODUCT OF SHIITAKE MUSHROOM GROWN ON WOOD LOGS

(71) Applicants:JANGHEUNG COUNTY RESEARCH INSTITUTE FOR MUSHROOM INDUSTRY, Jeollanam-do (KR); DAY.N BIO CORP., Jeollanam-do (KR); IMSIL CHEESE & FOOD RESEARCH INSTITUTE, Jeollabuk-do (KR)

(72) Inventors: Kyoung-Sun Seo, Jeollanam-do (KR); Kyung-Je Kim, Jeollanam-do (KR); Seong-Woo Jin, Jeollanam-do (KR); Young-Woo Koh, Jeollanam-do (KR); Seung-Bin Im, Jeollanam-do (KR); Neul-I Ha, Jeollanam-do (KR); Hee-Gyeong Jeong, Jeollanam-do (KR); Sang-Wook Jeong, Jeollanam-do (KR); Seung-Ju Kim, Jeollanam-do (KR); Jeong-Hee Kim, Jeollanam-do (KR); Hee-Soo Kim, Jeollanam-do (KR); Bok-Seon Kim, Jeollanam-do (KR); Yu-Jin Choi, Jeollabuk-do (KR); Da Hye Song, Jeollabuk-do (KR); Ki Man Kim, Gwangju (KR); Se Eun Park, Gwangju (KR); Junhui Choi, Jeollanam-do (KR)

(73) Assignees: JANGHEUNG COUNTY RESEARCH INSTITUTE FOR MUCHROOM INDUSTRY, Jeollanam-do (KR); DAY.N BIO CORP., Jeollanam-do (KR); IMSIL CHEESE & FOOD RESEARCH INSTITUTE, Jeollabuk-do (KR)

( * ) Notice: Subject to any disclaimer, the term of this patent is extended or adjusted under 35 U.S.C. 154(b) by 504 days.

(21) Appl. No.: 18/017,718

(22) PCT Filed: Dec. 16, 2021

(86) PCT No.: PCT/KR2021/019201
§ 371 (c)(1),
(2) Date: Jan. 24, 2023

(87) PCT Pub. No.: WO2022/131824
PCT Pub. Date: Jun. 23, 2022

(65) Prior Publication Data
US 2023/0284666 A1 Sep. 14, 2023

(30) Foreign Application Priority Data

Dec. 16, 2020 (KR) ........................ 10-2020-0176802

(51) Int. Cl.
| | |
|---|---|
| *A23C 9/123* | (2006.01) |
| *A23L 5/00* | (2016.01) |
| *A23L 23/00* | (2016.01) |
| *A23L 27/10* | (2016.01) |
| *A23L 29/00* | (2016.01) |
| *A23L 31/00* | (2016.01) |
| *C12N 1/20* | (2026.01) |

(Continued)

(52) U.S. Cl.
CPC ................. *A23L 31/00* (2016.08); *A23L 5/51* (2016.08); *A23L 23/00* (2016.08); *A23L 27/105* (2016.08); *A23L 29/065* (2016.08); *A23V 2400/113* (2023.08); *A23V 2400/427* (2023.08)

(58) Field of Classification Search
CPC . A23L 31/00; A23L 5/51; A23L 23/00; A23L 27/105; A23L 29/065; A23L 27/10; A23L 27/24; A23L 27/50; A23L 5/10; A23L 27/12; A23L 27/30; A23L 27/40; A23V 2400/113; A23V 2400/427; A23V 2002/00; A23V 2300/08; A23V 2300/14; A23V 2300/31
See application file for complete search history.

(56) References Cited

FOREIGN PATENT DOCUMENTS

| CN | 110810806 A1 * | 2/2020 |
|---|---|---|
| EP | 0465677 B1 * | 1/1991 |

(Continued)

OTHER PUBLICATIONS

Vegetable Green Curry Thai Recipe from UrbanFoodLover. Obtained from URL:< https://urbanfoodlover.com/vegetable-green-curry-thai-recipe/#recipe>. Jun. 2020. Obtained on Apr. 16, 2025. (Year: 2020).*

(Continued)

*Primary Examiner* — Erik Kashnikow
*Assistant Examiner* — Janice Y Silverman
(74) *Attorney, Agent, or Firm* — The PL Law Group, PLLC

(57) ABSTRACT

A method for producing fermented shiitake mushroom sauce according to an embodiment includes adding lactose and sucrose to shiitake mushroom concentrate followed by inoculation of *Pediococcus pentosaceus* strain or *Lactobacillus acidophilus* strain and fermentation to prepare lactic acid bacteria fermented product of shiitake mushroom, and mixing the lactic acid bacteria fermented product of shiitake mushroom prepared above with hot pepper extract, garlic extract, onion extract, and shiitake mushroom block, water, salt, lemongrass, and coriander, and the present invention also relates to fermented shiitake mushroom sauce produced by the aforementioned method.

3 Claims, 9 Drawing Sheets

(51) Int. Cl.
  *C12N 15/10*     (2006.01)
  *C05B 17/00*     (2006.01)
  *C05B 17/02*     (2006.01)

(56)           References Cited

FOREIGN PATENT DOCUMENTS

| EP | 1 075 798 A1 | 2/2001 |
| KR | 10-2008-0109585 A | 12/2008 |
| KR | 10-1178420 B1 | 8/2012 |
| KR | 10-2013-0015858 A | 2/2013 |
| KR | 10-2015-0142164 A | 12/2015 |
| KR | 10-2019-0022187 A | 3/2019 |
| KR | 10-2020-0097945 A | 8/2020 |
| KR | 10-2250846 B1 | 5/2021 |
| WO | WO-2014181219 A1 * | 11/2014 | .............. A23L 1/39 |

OTHER PUBLICATIONS

Courtney. Smoke Point of Oil. 2018. Obtained from URL:<https://www.knowyourproduce.com/smoke-point-of-oils/ on Apr. 15, 2025>. Obtained on Apr. 16, 2025. (Year: 2018).*

Dad's Pantry. Garlic Infused Olive Oil. 2018. Obtained from URL:< https://www.dadspantry.com/2018/12/garlic-infused-olive-oil/>, obtained on Apr. 17, 2025. (Year: 2018).*

International Search Report for PCT/KR2021/019201 mailed on Mar. 24, 2022.

* cited by examiner

FIG. 9

METHOD FOR PRODUCING FERMENTED SHIITAKE MUSHROOM SAUCE USING LACTIC ACID BACTERIA FERMENTED PRODUCT OF SHIITAKE MUSHROOM GROWN ON WOOD LOGS

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/KR2021/019201 filed on Dec. 16, 2021, which claims priority to the benefit of Korean Patent Application No. 10-2020-0176802 filed in the Korean Intellectual Property Office on Dec. 16, 2020, the entire contents of which are incorporated herein by reference.

BACKGROUND

1. Technical Field of Invention

The present invention provides a method for producing fermented shiitake mushroom sauce characterized in that it is produced by including; (1) adding water to shiitake mushroom powder followed by extraction and concentration to prepare shiitake mushroom concentrate; (2) adding lactose and sucrose to the shiitake mushroom concentrate prepared in the step (1) followed by inoculation of *Pediococcus pentosaceus* strain or *Lactobacillus acidophilus* strain and fermentation to prepare lactic acid bacteria fermented product of shiitake mushroom; (3) adding corn germ oil to hot pepper powder followed by extraction, filtration, and heating to prepare hot pepper extract; (4) adding olive oil to crushed garlic obtained by crushing a garlic followed by roasting and filtration to prepare garlic extract; (5) adding olive oil to crushed onion obtained by crushing an onion followed by heating to prepare onion extract; (6) cutting shiitake mushroom to blocks followed by drying to prepare a shiitake mushroom block; and (7) mixing the lactic acid bacteria fermented product of shiitake mushroom prepared in the step (2), the hot pepper extract prepared in the step (3), the garlic extract prepared in the step (4), the onion extract prepared in the step (5), and the shiitake mushroom block prepared in the step (6) with water, salt, lemongrass, and coriander, and the present invention also provides fermented shiitake mushroom sauce produced by the aforementioned method.

2. BACKGROUND OF INVENTION

During the past decades, Thai food and Mexican food are quite popular in global market. In recent years, however, Vietnamese food and Korean food (i.e., K-food) are drawing attention. As people all over the world are more interested in vegetarian diet and premium vegetarian culture is gaining popularity after an arrival of the southeastern vegetarian influencer named KOLs, plant-based condiments and plant-based sauces are wanted more in Vietnam, Malaysia, Indonesia, and Thailand.

In Vietnam and Thailand, both having the highest market share of sauces in Southeast Asia, salted fish sauce referred to as fish sauce has very high market size (i.e., 50% or so of the entire sauce market). It appears that the first thing to be considered for developing a food product for vegetarians in Southeast Asia is development of a plant-based sauce which has nutritional balance and flavors including amino acids preferred by local people.

Meanwhile, although there are already well-established laws and regulations, due to the chaotic distribution structure in South Korea in which shiitake mushroom grown in media is not clearly separated from shiitake mushroom grown on wood logs, consumer prices of the shiitake mushroom grown on wood logs become even lower than the production cost. As the prices of shiitake mushroom grown on wood logs are close to the bottom and lower competitiveness is caused by illegal activity and spreading of misinformation, the reliability of Chang-heung shiitake mushroom, which has been built by overcoming many difficulties, is now degraded and the farmers and related industries are currently hitting rock bottom.

In addition, while the export of shiitake mushroom to China is not allowed, Chinese mushroom are presently imported to South Korea in an amount of 18,000 tons or more per year (export of South Korean products to foreign countries: 340 tons, source: AT) and there is also highest risk caused by China capital investment.

To ensure the stable income of about 690 farm households growing shiitake mushroom on wood logs, it is urgently needed to develop a new global market. In all Southeastern Asian countries except Indonesia and Malaysia, temple business is the most promising business item due to their strong religious culture.

In fact, the religion with most followers in Vietnam is Buddhism (i.e., 11 to 14 millions). As a food material that needs to be essentially consumed by believers of Buddhism, shiitake mushroom grown on wood logs is specifically designated. Vietnamese people reproduce original taste of foods by using soybean, meat, or liquid fermentation sauce for vegetarians, or the like, and they are not particularly concerned with the appearance of foods. Thus, the range of vegetarian diet materials and cooking methods is broader when compared to other countries. Various processed food products for vegetarian with various types of product and various package shapes including canned food, dried food, instant rice noodle, and ramen are now commercially available in Vietnam market.

Meanwhile, in Korea Patent Publication No. 2019-0022187, a method of producing sauce by using shiitake mushroom and fruits of *Schisandra chinensis* is disclosed, and, in Korea Patent Publication No. 2020-0097945, a method of producing sauce added with mushroom and grape extract is disclosed. However, those methods are different from the method of the present invention for producing fermented shiitake mushroom sauce which uses lactic acid bacteria fermented product of shiitake mushroom grown on wood logs.

SUMMARY

The present invention is devised under the circumstances that are described in the above, and object of the present invention is to provide a method for producing fermented shiitake mushroom sauce that can enhance the flavor and umami taste (i.e., sweet and savory taste) of food by selecting a bacterial strain suitable for fermentation of shiitake mushroom grown on wood logs and mixing the lactic acid bacteria fermented product of shiitake mushroom grown on wood logs with side ingredients in suitable amount.

To solve the problem described in the above, the present invention provides a method for producing fermented shiitake mushroom sauce characterized in that it is produced by including; (1) adding water to shiitake mushroom powder followed by extraction and concentration to prepare shiitake mushroom concentrate; (2) adding lactose and sucrose to the shiitake mushroom concentrate prepared in the step (1) followed by inoculation of *Pediococcus pentosaceus* strain or *Lactobacillus acidophilus* strain and fermentation to prepare lactic acid bacteria fermented product of shiitake mushroom; (3) adding corn germ oil to hot pepper powder followed by extraction, filtration, and heating to prepare hot pepper extract; (4) adding olive oil to crushed garlic obtained by crushing a garlic followed by roasting and filtration to prepare garlic extract; (5) adding olive oil to crushed onion obtained by crushing an onion followed by heating to prepare onion extract; (6) cutting shiitake mushroom to blocks followed by drying to prepare a shiitake mushroom block; and (7) mixing the lactic acid bacteria fermented product of shiitake mushroom prepared in the step (2), the hot pepper extract prepared in the step (3), the garlic extract prepared in the step (4), the onion extract prepared in the step (5), and the shiitake mushroom block prepared in the step (6) with water, salt, lemongrass, and coriander.

The present invention also provides fermented shiitake mushroom sauce produced by the aforementioned method.

The lactic acid bacteria fermented product of shiitake mushroom grown on wood logs of the present invention, which is added to sauces, can enhance the flavor and umami taste while maximizing the nutritional value of shiitake mushroom grown on wood logs, and thus sauce prepared by mixing the fermented product of shiitake and side ingredients in suitable amount has hot and spicy taste and also excellent umami taste so that it can be easily used for foods requiring hot taste and also umami taste. Moreover, since only the natural ingredients are used, it is possible to provide a consumer with health-oriented sauce having environment-friendly taste and high added value.

BRIEF DESCRIPTION OF THE DRAWINGS

FIG. 9 is a graph for comparing the activity of inhibiting PGE-2 by the liquid extract of shiitake mushroom grown on wood logs (Control, Preparation example 1), fermented product of shiitake mushroom grown on wood logs (KCTC 14826BP, KCTC 14825BP, Preparation example 2), and fermented shiitake mushroom sauce (Preparation example 3), which have been prepared at various concentrations.

DETAILED DESCRIPTION

Figure 1:
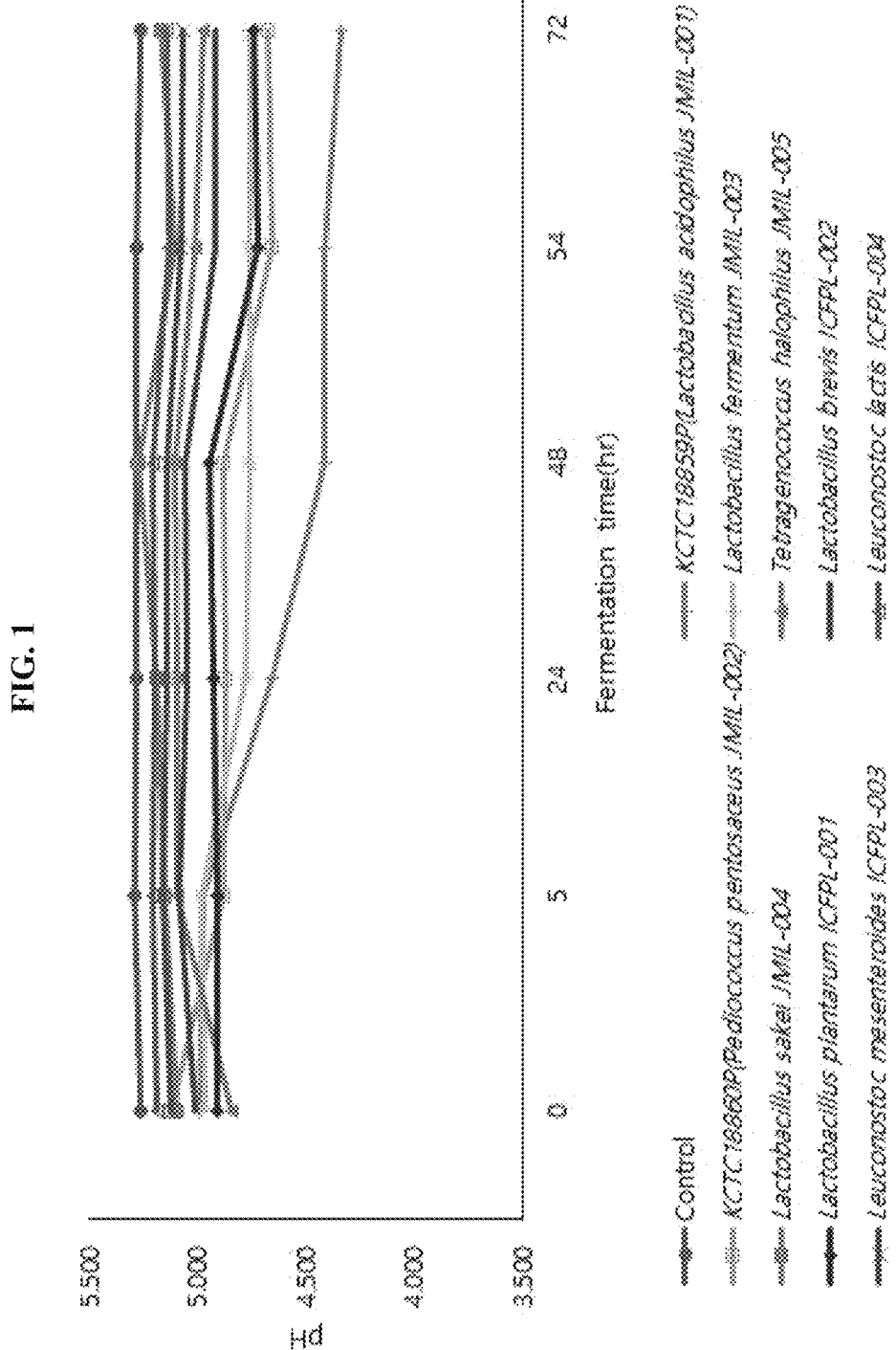
FIG. 1 is a graph for determining a change in pH of the fermented product of shiitake mushroom grown on wood logs depending on various bacterial strain types and different fermentation period.

To achieve the purpose of the present invention that is described in the above, the present invention provides a method for producing fermented shiitake mushroom sauce characterized in that it is produced by including:

(1) adding water to shiitake mushroom powder followed by extraction and concentration to prepare shiitake mushroom concentrate;

(2) adding lactose and sucrose to the shiitake mushroom concentrate prepared in the step (1) followed by inoculation of *Pediococcus pentosaceus* strain or *Lactobacillus acidophilus* strain and fermentation to prepare lactic acid bacteria fermented product of shiitake mushroom;

(3) adding corn germ oil to hot pepper powder followed by extraction, filtration, and heating to prepare hot pepper extract;

(4) adding olive oil to crushed garlic obtained by crushing a garlic followed by roasting and filtration to prepare garlic extract;

(5) adding olive oil to crushed onion obtained by crushing an onion followed by heating to prepare onion extract;

(6) cutting shiitake mushroom to blocks followed by drying to prepare a shiitake mushroom block; and (7) mixing the lactic acid bacteria fermented product of shiitake mushroom prepared in the step (2), the hot pepper extract prepared in the step (3), the garlic extract prepared in the step (4), the onion extract prepared in the step (5), and the shiitake mushroom block prepared in the step (6) with water, salt, lemongrass, and coriander.

With regard to the method for producing fermented shiitake mushroom sauce of the present invention, *Pediococcus pentosaceus* strain mentioned above is a strain which has been deposited with Korea Research Institute of Bioscience and Biotechnology (having the address of 181, Ipsin-gil, Jeongeup-si, Jeollabuk-do 56212, Republic of Korea) on Dec. 15, 2021 under the Accession number of KCTC 14826BP. The deposit has been made under the terms of the Budapest Treaty and all restrictions imposed by the depositor on the availability to the public of the biological material will be irrevocably removed upon the granting of a patent. Furthermore, *Lactobacillus acidophilus* strain mentioned above is a strain which has been deposited with Korea Research Institute of Bioscience and Biotechnology on Dec. 15, 2021 under the Accession number of KCTC 14825BP. The deposit has been made under the terms of the Budapest Treaty and all restrictions imposed by the depositor on the availability to the public of the biological material will be irrevocably removed upon the granting of a patent. When the lactic acid bacteria fermented product of shiitake mushroom is produced by using the specific strains that have been deposited as described above, it is possible to prepare a fermented product which not only has excellent umami taste, high content of ergothioneine, ergosterol, and β-glucan, and increased amount of nucleic acid-related materials and amino acids such as aspartic acid and glutamic acid exhibiting umami taste but also shows an excellent anti-inflammatory activity by having enhanced activity of inhibiting NO, IL-1B, TNF-α, and prostaglandin E2 (PGE2), which cause an inflammation, without exhibiting any cell cytotoxicity.

Furthermore, with regard to the method for producing fermented shiitake mushroom sauce described in the present invention, the shiitake mushroom concentrate of the step (1) may be preferably prepared by adding 8 to 12 times (v/w) of water to shiitake mushroom powder followed by extraction for 4 to 6 hours at 75 to 85° C. and concentration. More preferably, it may be prepared by adding 10 times (v/w) of water to shiitake mushroom powder followed by extraction for 5 hours at 80° C. and concentration. When the extraction is carried out at the conditions described above, more efficient extraction can be achieved due to the higher solid content.

Furthermore, with regard to the method for producing fermented shiitake mushroom sauce of the present invention, the lactic acid bacteria fermented product of shiitake mushroom of the step (2) may be preferably prepared by adding to the shiitake mushroom concentrate lactose and sucrose, in an amount of 2.5 to 3.5% and 1.8 to 2.2%, respectively, relative to the weight of shiitake mushroom concentrate, followed by inoculation of *Pediococcus pentosaceus* JMIL002 strain (KCTC 14826BP) or *Lactobacillus acidophilus* JMIL001 strain (KCTC 14825BP) and fermentation for 2 to 4 days at 34 to 40° C. More preferably, it may be prepared by adding to the shiitake mushroom concentrate lactose and sucrose, in an amount of 3% and 2%, respectively, followed by inoculation of *Pediococcus pentosaceus* JMIL002 strain (KCTC 14826BP) or *Lactobacillus acidophilus* JMIL001 strain (KCTC 14825BP) and fermentation for 3 days at 37° C. When the fermentation is carried out at the conditions described above, fermentation with enhanced flavor and umami taste can be obtained while unpleasant odor specific to shiitake mushroom is avoided.

Furthermore, with regard to the method for producing fermented shiitake mushroom sauce of the present invention, the hot pepper extract of the step (3) may be preferably prepared by adding corn germ oil in an amount of 4.5 to 5.5 L to 450 to 550 g of hot pepper powder followed by extraction for 15 to 25 minutes at 110 to 130° C., filtration, and heating for 20 to 40 minutes at 95 to 105° C. More preferably, it may be prepared by adding corn germ oil in an amount of 5 L to 500 g of hot pepper powder followed by extraction for 20 minutes at 120° C., filtration, and heating for 30 minutes at 100° C.

Furthermore, with regard to the method for producing fermented shiitake mushroom sauce of the present invention, the garlic extract of the step (4) may be preferably prepared by adding olive oil in an amount of 450 to 550 mL to crushed garlic obtained by crushing 0.8 to 1.2 kg of garlic followed by roasting for 4 to 6 minutes at 110 to 130° C. and filtration. More preferably, it may be prepared by adding olive oil in an amount of 500 mL to crushed garlic obtained by crushing 1 kg of garlic followed by roasting for 5 minutes at 120° C. and filtration.

Furthermore, with regard to the method for producing fermented shiitake mushroom sauce of the present invention, the onion extract of the step (5) may be preferably prepared by adding olive oil in an amount of 3.5 to 4.5 L to crushed onion obtained by crushing 1.5 to 2.5 kg of onion followed by heating for 8 to 12 minutes at 110 to 130° C. More preferably, it may be prepared by adding olive oil in an amount of 4 L to crushed onion obtained by crushing 2 kg of onion followed by heating for 10 minutes at 120° C.

When the hot pepper extract, garlic extract, and onion extract are prepared at the conditions of the above step (3) to step (5), it was possible to prepare an extract which has maximized original taste and flavor of ingredients and good harmony with other sauce ingredients.

Furthermore, with regard to the method for producing fermented shiitake mushroom sauce of the present invention, the shiitake mushroom block of the step (6) may be preferably prepared by cutting shiitake mushroom to blocks with size of 4.5 to 5.5× 4.5 to 5.5 mm followed by drying for 10 to 14 hours at 55 to 65° C. More preferably, it may be prepared by cutting shiitake mushroom to blocks with size of 5×5 mm followed by drying for 12 hours at 60° C. to prepare a shiitake mushroom block. When the shiitake mushroom block is prepared at the conditions described above, excellent chewing feeling and preference can be obtained and also it was most preferred in terms of the convenience and efficiency of working process.

Still furthermore, with regard to the method for producing fermented shiitake mushroom sauce of the present invention, the mixing of the step (7) may be mixing 32 to 38% by weight of the lactic acid bacteria fermented product of shiitake mushroom, 7 to 9% by weight of the hot pepper extract, 3.5 to 4.5% by weight of the garlic extract, 5.5 to 6.5% by weight of the onion extract, and 12 to 18% by weight of the shiitake mushroom block with 23 to 29% by weight of water, 2.5 to 3.5% by weight of salt, 1.8 to 2.2% by weight of lemongrass, and 0.8 to 1.2% by weight of coriander, based on total weight of the fermented shiitake mushroom sauce. More preferably, the mixing is to mix 35% by weight of the lactic acid bacteria fermented product of shiitake mushroom, 8% by weight of the hot pepper extract, 4% by weight of the garlic extract, 6% by weight of the onion extract, and 15% by weight of the shiitake mushroom block with 26% by weight of water, 3% by weight of salt, 2% by weight of lemongrass, and 1% by weight of coriander, based on total weight of the fermented shiitake mushroom sauce. When fermented shiitake mushroom sauce is produced with the ingredients of the above type and blending ratio, even more enhanced flavor of sauce can be obtained due to harmonious existence of taste and flavor of various ingredients. In addition, when the sauce is used for cooking food or dipping, it can play a role of further enhancing the flavor and umami taste of the food. More specifically, the method for producing fermented shiitake mushroom sauce of the present invention may include:

(1) adding 8 to 12 times (v/w) of water to shiitake mushroom powder followed by extraction for 4 to 6 hours at 75 to 85° C. and concentration to prepare shiitake mushroom concentrate;

(2) adding to the shiitake mushroom concentrate prepared in the step (1) lactose and sucrose, in an amount of 2.5 to 3.5% and 1.8 to 2.2%, respectively, relative to the weight of shiitake mushroom concentrate, followed by inoculation of *Pediococcus pentosaceus* JMIL002 strain (KCTC 14826BP) or *Lactobacillus acidophilus* JMIL001 strain (KCTC 14825BP) and fermentation for 2 to 4 days at 34 to 40° C. to prepare lactic acid bacteria fermented product of shiitake mushroom;

(3) adding corn germ oil in an amount of 4.5 to 5.5 L to 450 to 550 g of hot pepper powder followed by extraction for 15 to 25 minutes at 110 to 130° C., filtration, and heating for 20 to 40 minutes at 95 to 105° C. to prepare hot pepper extract;

(4) adding olive oil in an amount of 450 to 550 mL to crushed garlic obtained by crushing 0.8 to 1.2 kg of garlic followed by roasting for 4 to 6 minutes at 110 to 130° C. and filtration to prepare garlic extract;

(5) adding olive oil in an amount of 3.5 to 4.5 L to crushed onion obtained by crushing 1.5 to 2.5 kg of onion followed by heating for 8 to 12 minutes at 110 to 130° C. to prepare onion extract;

(6) cutting shiitake mushroom to blocks with size of 4.5 to 5.5×4.5 to 5.5 mm followed by drying for 10 to 14 hours at 55 to 65° C. to prepare a shiitake mushroom block; and (7) mixing 32 to 38% by weight of the lactic acid bacteria fermented product of shiitake mushroom prepared in the step (2), 7 to 9% by weight of the hot pepper extract prepared in the step (3), 3.5 to 4.5% by weight of the garlic extract prepared in the step (4), 5.5 to 6.5% by weight of the onion extract prepared in the step (5), and 12 to 18% by weight of the shiitake mushroom block prepared in the step (6) with 23 to 29% by weight of water, 2.5 to 3.5% by weight of salt, 1.8 to 2.2% by weight of lemongrass, and 0.8 to 1.2% by weight of coriander, based on total weight of the fermented shiitake mushroom sauce.

Even more specifically, the method may include:

(1) adding 10 times (v/w) of water to shiitake mushroom powder followed by extraction for 5 hours at 80° C. and concentration to prepare shiitake mushroom concentrate;

(2) adding to the shiitake mushroom concentrate prepared in the step (1) lactose and sucrose, in an amount of 3% and 2%, respectively, relative to the weight of shiitake mushroom concentrate, followed by inoculation of *Pediococcus pentosaceus* JMIL002 strain (KCTC 14826BP) or *Lactobacillus acidophilus* JMIL001 strain (KCTC 14825BP) and fermentation for 3 days at 37° C. to prepare lactic acid bacteria fermented product of shiitake mushroom;

(3) adding corn germ oil in an amount of 5 L to 500 g of hot pepper powder followed by extraction for 20 minutes at 120° C., filtration, and heating for 30 minutes at 100° C. to prepare hot pepper extract;

(4) adding olive oil in an amount of 500 mL to crushed garlic obtained by crushing 1 kg of garlic followed by roasting for 5 minutes at 120° C. and filtration to prepare garlic extract;

(5) adding olive oil in an amount of 4 L to crushed onion obtained by crushing 2 kg of onion followed by heating for 10 minutes at 120° C. to prepare onion extract;

(6) cutting shiitake mushroom to blocks with size of 5×5 mm followed by drying for 12 hours at 60° C. to prepare a shiitake mushroom block; and (7) mixing 35% by weight of the lactic acid bacteria fermented product of shiitake mushroom prepared in the step (2), 8% by weight of the hot pepper extract prepared in the step (3), 4% by weight of the garlic extract prepared in the step (4), 6% by weight of the onion extract prepared in the step (5), and 15% by weight of the shiitake mushroom block prepared in the step (6) with 26% by weight of water, 3% by weight of salt, 2% by weight of lemongrass, and 1% by weight of coriander, based on total weight of the fermented shiitake mushroom sauce.

The present invention further provides fermented shiitake mushroom sauce produced by the aforementioned method.

Hereinbelow, the present invention is explained in greater detail in view of the Examples. However, the following Preparation examples and Examples are given only for more specific explanation of the present invention and it is evident that the scope of the present invention is not limited by those Preparation examples and Examples.

EXAMPLES

Preparation Example 1. Preparation of Extract of Shiitake Mushroom Grown on Wood Logs By crushing fall shiitake mushroom grown on wood logs which has been obtained after sun drying, stalk powder of shiitake mushroom grown on wood logs was prepared to have a size of 80 mesh or so. To thus-prepared stalk powder of shiitake mushroom grown on wood logs, 10 times (w/v) of purified water was added. After carrying out extraction for 5 hours in a water bath at constant-temperature of 80° C. and filtration using a filter paper, the resultant was concentrated to 40 brix by concentration under reduced pressure.

Preparation Example 2. Preparation of Plant-Based Lactic Acid Bacteria Fermented Product of Shiitake Mushroom Grown on Wood Logs To the extract of shiitake mushroom grown on wood logs of Preparation example 1 above, water was added for adjustment to 10 brix. Then, lactose and sucrose were added in an amount of 3% and 2%, respectively, in terms of the weight. Sterilization was carried out for 15 minutes by using an autoclave (121° C., 1.2 atm). Once the sterilized liquid is cooled down to room temperature in germ-free state, it was inoculated with 10 mL of *Pediococcus pentosaceus* JMIL002 strain (KCTC 14826BP) or *Lactobacillus acidophilus* JMIL001 strain (KCTC 14825BP), and fermented for 3 days (72 hours) at 37° C. to prepare a plant-based lactic acid bacteria fermented product of fall shiitake mushroom grown on wood logs.

Preparation Example 3. Preparation of Fermented Shiitake Mushroom Sauce (1) To 500 g of hot pepper powder obtained after 20-mesh sifting, 5 L of corn germ oil was added and extraction was carried out for 20 minutes at 120° C. Then, solid matters were removed by filtering through a wire filter followed by heating for 30 minutes at 100° C. to prepare hot pepper extract.

(2) 1 kg of garlic was washed, dried to remove water, and crushed using a crusher. Then, olive oil was added in an amount of 500 mL and the resultant was roasted for 5 minutes at 120° C. By filtering the roasted garlic through a wire filter, garlic extract was prepared.

(3) 2 kg of onion was washed, dried to remove water, and crushed using a crusher. Then, olive oil was added in an amount of 4 L and the resultant was heated for 10 minutes at 120° C. By cooling the resultant at room temperature, oil extract of onion (i.e., porridge) was prepared.

(4) 5 kg of shiitake mushroom grown on wood logs was washed and cut to blocks with a size of 5×5 m. By drying them for 12 hours at 60° C., a shiitake mushroom block was prepared.

(5) Based on the total weight of the fermented shiitake mushroom sauce, 35% by weight of the lactic acid bacteria fermented product of shiitake mushroom prepared in Preparation example 2, 8% by weight of the hot pepper extract prepared in the step (1), 4% by weight of the garlic extract prepared in the step (2), 6% by weight of the oil extract of onion prepared in the step (3), 15% by weight of the shiitake mushroom block prepared in the step (4), and also other ingredients including 26% by weight of water, 3% by weight of salt, 2% by weight of lemongrass, and 1% by weight of coriander were prepared.

As for the method for producing sauce using the ingredients that are prepared above, the shiitake mushroom block was added first to the lactic acid bacteria fermented product of shiitake mushroom for swelling, and then it was added with a mixture in which the hot pepper extract, garlic extract, oil extract of onion are admixed with one another. To the sauce base obtained after the addition, purified water and salt were also added and heated for 30 minutes at 90° C. To the heated liquid obtained after the heating, lemongrass and coriander were added as a condiment plant. Thereafter, the mixture was filled in a container and sterilized for 1 hour at 80° C.

1. Experimental Methods

A) Establishment of Fermentation Conditions

Liquid extract of shiitake mushroom grown on wood logs, which has 40 brix, was added with 4 times of water for adjustment to 10 brix. Then, lactose and sucrose were added in an amount of 3% and 2%, respectively, in terms of the weight. Sterilization was carried out for 15 minutes by using an autoclave (121° C., 1.2 atm). Once the sterilized liquid is cooled down to room temperature in germ-free state, it was inoculated with *Lactobacillus acidophilus* JMIL001 strain (KCTC 14825BP), *Pediococcus pentosaceus* JMIL002 strain (KCTC 14826BP), *Lactobacillus fermentum* JMIL-003, *Lactobacillus sakei* JMIL-004, *Tetragenococcus halo-philus* JMIL-005, *Lactobacillus plantarum* ICFPL-001, *Lactobacillus brevis* ICFPL-002, *Leuconostoc mesenteroides* ICFPL-003, or *Leuconostoc lactis* ICFPL-004, each in an amount of 10 mL, and fermented for 72 hours at 37° C. to prepare a plant-based lactic acid bacteria fermented product of fall shiitake mushroom which has been grown on wood logs.

B) Component Analysis

1) General Components

According to the AOAC method, the analysis was carried out as follows: heating and drying at 105° C. and atmospheric pressure for moisture content, Micro-Kjeldahl method for crude proteins, Soxhlet's extraction method for crude lipids, and 550° C. ashing method for crude ashes.

2) Analysis of Free Sugar

Distilled water was added to 5 g of sample. After homogenizing them using a homogenizer followed by stirring and leaching, the resultant was adjusted to 100 mL and centrifuged (3,000 rpm, 30 minutes). Then, purification using Sep-pak $C_{18}$ was carried out and the filtered solution obtained after filtering through a 0.45 μm membrane filter (Millipore Co., USA) was analyzed by HPLC (High Performance Liquid Chromatography). The analysis conditions were as described in the following Table 1 and the content was calculated based on the external standard method.

TABLE 1

| HPLC conditions for analysis of free sugar | |
|---|---|
| Item | Conditions for analysis |
| Instrument | Agilent Technologies 1200 Series, ELSD detector |
| Column | ZORBAX Carbohydrate (4.6 × 150 mm) |
| Solvent | 85% Acetonitrile |
| Column temp. | 30° C. |
| Flow rate | 1.4 ml/min |
| Injection volume | 20 μl |

3) Analysis of β-glucan

Beta glucan in the sample was measured by using Megazyme kit (Mushroom and Yeast β-glucan Assay Procedure K-YBGL, Megazyme, Ireland).

First, to measure the total glucan, 100 mg of the crushed sample obtained after sifting through a 100 mesh sieve were added to a tube, and then, after adding 1.5 mL of 37% HCl to the sample, degraded for 45 minutes in a water bath at constant-temperature of 30° C. After that, distilled water was added in an amount of 10 mL followed by vortexing and culture for 2 hours at 100° C. While cooling to room temperature, the mixture was added with 10 mL of 2 N KOH and adjusted to 100 mL with sodium acetate buffer followed by thorough mixing. Thereafter, to 0.1 mL of the supernatant, 0.1 mL of exo-1,3-β-glucanase plus β-glucosidase dissolved in 200 mM sodium acetate buffer was added while 0.2 mL of acetate buffer was added for the reagent blank. As D-glucose standard, 0.1 mL of D-glucose standard and 0.1 mL of acetate buffer were mixed with each other, and culture was carried out for 60 minutes at 40° C. Next, GOPOD (glucose oxidase/peroxidase mixture) was added in an amount of 3 mL and culture was carried out for 20 minutes at 40° C. Absorbance at 510 nm was measured.

To measure α-glucan, 100 mg of the crushed sample obtained after sifting through a 100 mesh sieve were added to a tube, and then, after adding 2 mL of 2 M KOH, the mixture was mixed for 20 minutes. After adding 8 mL of 1.2 M sodium acetate buffer followed by addition of 0.2 mL of amyloglucosidase plus invertase and thorough mixing, culture was carried out for 30 minutes in a water bath at constant-temperature of 40° C. Thereafter, to 0.1 mL of the supernatant, 0.1 mL of 200 mM sodium acetate buffer and 3 mL of GOPOD were added, and culture was carried out for 20 minutes at 40° C. Absorbance at 510 nm was then measured. By subtracting the content of α-glucan from the content of total glucan, content of β-glucan was quantified.

4) Ergothioneine

For analyzing ergothioneine, 0.2 g of a sample was added with cold ethanol solution for extraction (10 mM DTT, 100 μM betaie, 100 μM MMI in 70% ethanol) followed by stirring and ultrasonication for 3 minutes. The resultant was added and mixed with 4 mL of ethanol solution containing 1% SDS, and then centrifuged. 10 mL of the supernatant was then subjected to freeze drying. After adding 10 mL of distilled water (pH 7.3) to the resultant followed by centrifuge, the obtained supernatant was used for analyzing the content of ergothioneine. Content was calculated based on the external standard method.

5) Analysis of Nucleic Acid-Related Materials

About 2 g of a sample was weighed and added with 10 mL of 10%-HC104. After homogenization and filling in a test tube to 25 mL, the mixture was allowed to stand for 30 minutes and then filtered. pH of the supernatant was adjusted, and the pH-adjusted solution was brought to 50 mL by using 10%-HClO$_4$. After allowing the mixture to stand for 30 minutes, it was filtered through a 0.4 μm filter and then subjected to HPLC analysis. As a column, U-Bondapak C18 (4 mm×30 cm) was used. Elution was made with detector wavelength of 265 nm and 30% methanol as a solvent. With regard to the quantification, GMP (5'-guanosine cyclic monophosphate), IMP (5'-inosine mono phosphate), and XMP (5'-xanthylic acids) were quantified based on the external standard method.

6) Amino Acid Analysis 6-1) Analysis of Constitutional Amino Acids

Sample (0.5 g) was added to a test tube and, after adding 10 mL of 6 N-HCl solution, subjected to hydrolysis for 24 hours at 110° C. Thus-obtained solution was centrifuged and the resulting supernatant was concentrated at 50° C. to completely evaporate hydrochloric acid and water. After adjusting the mixture to 5 mL with 20 mM HCl (pH 2.2), it was filtered through a 0.45 μm membrane filter. The obtained filtered solution was then derivatized using the reagents of Agilent amino kit. Thereafter, it was analyzed by HPLC.

6-2) Analysis of Free Amino Acids

For the analysis of free amino acids in a sample, 10 mL of the solution, which has been obtained by the same pre-treatment as the analysis of free sugar, was added with 25 mg of sulfosalicylic acid and the mixture was allowed to stand for 4 hours at 4° C. Proteins were then removed by centrifuge (50000 rpm, 30 minutes) and the filtered solution, which has been obtained by filtering through a 0.45 μm membrane filter, was then derivatized then using the reagents of Agilent amino kit. Thereafter, it was analyzed by HPLC. Conditions for the analysis are as described in the following Table 2.

TABLE 2

Conditions for amino acid analysis

| Item | Analysis conditions | | |
|---|---|---|---|
| Instrument | Agilent Technologies 1200 Serles | | |
| Detector | Agilent Technologies 1200 Series DAD | | |
| Column | Poroshell HPH C18 (2.1 × 150 mm. 4 um) | | |
| Column temp | 40° C. | | |
| Buffer solution | A: 10 mM Sodium phosphate Di-basic: 10 mM Sodium tetraborate 7H2O = 1:1 pH 8.2 (adjusted with phsporic acid), B: Acetonitrile:Methanol:Water = 45:45:10 | | |
| | Time(min) | A(%) | B(%) |
| | 0 | 96 | 2 |
| | 5 | 84 | 16 |
| | 9 | 72 | 28 |
| | 13 | 60 | 40 |

TABLE 2-continued

Conditions for amino acid analysis

| Item | Analysis conditions | | |
|---|---|---|---|
| | 15 | 40 | 60 |
| | 15.1 | 10 | 90 |
| | 17 | 10 | 90 |
| Wavelength (nm) | UV 338 | | |
| Flow rate | 0.35 mL/min | | |
| Injection volume | 5 μL | | |

7) Sensory Evaluation

Sensory test was carried out for 30 people who satisfied the panel requirement described in Korean Food Code. Requirement regarding the age and sex was fully satisfied. With regard to the items for preference evaluation, 9-point scoring method was employed for color, flavor, taste, and overall preference. Criteria for evaluation were as follows: very good-9; moderate-5; very bad-1. Number of the test sample was changed with an interval of 2 hours, and the test was repeated 3 times with the same panel. For each repeated test, the highest and lowest scores were excluded to calculate the average score.

8) Cell Culture 8-1) Culture of RAW264.7 Cells and RBL-2H3 Cells

Culture of RAW264.7 cells and RBL-2H3 cells was carried out, by using cell culture broth containing Dulbecco Modified Eagle Medium (DMEM, Welgene, Gyeongsan, South Korea) added with 10% FBS (fetal bovine serum), 100 U/mL penicillin, and 100 μg/mL streptomycin, in CO$_2$ cell culture device at 37° C. under moisture condition (5% CO$_2$/95% air). When about 80% of a culture dish is covered by the cells, cell monolayer was washed out with PBS (phosphate-buffered saline, pH 7.4). After a treatment with 0.25% trypsin-2.65 mM EDTA, subculture was carried out. The culture medium was replaced with new medium every 2 days.

8-2) Culture of AGS Cells

Culture of AGS cells was carried out, by using RPMI medium (HyClone Laboratris Inc.) containing 10% FBS (fetal bovine serum, HyClone Laboratories Inc., Logan, UT, USA) and 1% antibiotics, at 5% CO$_2$, 37° C. conditions. For every 48 hours, the cells were brought into a floating state by using trypsin-EDTA (HyClone Laboratories Inc.), and then the cells were aliquoted to 1×10$^6$ cell/mL and subcultured.

8-3) Determination of Cell Viability

Cell cytotoxicity was measured by MTT analysis. Specifically, each cells were cultured in a 96-well plate at a density of 1×10$^5$ cells/mL, and used for the test. After treating with a sample at different concentrations of 50, 100, 200, 300, and 500 μg/mL for 24 hours, the medium was removed. New medium was added with 10 μl MTS, and the reaction was allowed to occur for 4 hours. Absorbance was then measured at 540 nm. The cell viability of each sample was calculated relatively by having the viability of no sample treatment group set at 100%.

9) Measurement of Production Amount of NO (Nitric Oxide)

Raw 264.7 cells were aliquoted onto a 96-well plate such that they are present 1×10$^5$ cells/mL in each well. After culture for 24 hours, the cells were treated with a sample and LPS (lipopolysaccharide). LPS was treated at concentration of 1 μg/mL, and each sample was diluted first to various concentrations of 50, 70, 100, 200, 300, and 400 µg/mL, and then added to the cells. Cell culture broth was collected after 24 hours and the activity of inhibiting NO production was measured by NO assay, which uses Griess reagent system.

10) Measurement of Production Amount of Inflammatory Cytokines (IL-1β, TNF-α)

Production amount of IL-1β and NF-α in cell culture broth was measured by using mouse ELISA (enzyme-linked immnunosorbent assay) kit. Raw 264.7 cells were adjusted to $5 \times 10^5$ cells/ml with DMEM medium, and then inoculated to a 6-well plate and cultured for 24 hours in a 5% $CO_2$ incubator. One hour after the treatment of cells with 1 µg/mL

14 taste, and overall preference. As a result of the sensory test, it was found that more undesirable chewing feeling is obtained as the width thickness of shiitake mushroom slice increases. Preference in terms of the color and flavor was not much different up to the thickness of 5×5 mm. In terms of the taste, high preference was shown when the slice width is 5×5 mm or less, and the highest preference was shown from 5×5 mm. In terms of the overall preference, the highest preference was obtained from the 5×5 mm slice and 3×3 mm slice. For the sake of convenience and efficiency of operational process, conditions for preparing shiitake mushroom slice were finally set at the thickness of 5×5 mm.

TABLE 3

Sensory test of shiitake mushroom block prepared at various thickness for producing plant-based lactic acid bacteria fermented shiitake mushroom sauce

| Thickness of shiitake mushroom block (mm) | Sensory score | | | | |
|---|---|---|---|---|---|
| | Chewing feeing | Color | Flavor | Taste | Overall preference |
| 3 × 3 | $7.4 \pm 0.54^{ab}$ | $6.5 \pm 0.52^{a}$ | $6.1 \pm 0.41^{a}$ | $6.5 \pm 0.23^{a}$ | $6.8 \pm 0.31^{a}$ |
| 4 × 4 | $6.5 \pm 0.40^{b}$ | $6.9 \pm 0.82^{a}$ | $5.8 \pm 0.50^{a}$ | $6.1 \pm 0.21^{ab}$ | $6.1 \pm 0.24^{ab}$ |
| 5 × 5 | $8.1 \pm 0.36^{a}$ | $6.8 \pm 0.85^{a}$ | $6.5 \pm 0.37^{a}$ | $6.8 \pm 0.32^{a}$ | $7.1 \pm 0.34^{a}$ |
| 6 × 6 | $5.0 \pm 0.31^{c}$ | $6.3 \pm 1.26^{a}$ | $5.2 \pm 0.75^{b}$ | $5.7 \pm 0.31^{ab}$ | $5.4 \pm 0.37^{c}$ |
| 7 × 7 | $4.4 \pm 0.69^{c}$ | $5.8 \pm 0.78^{ab}$ | $4.7 \pm 0.88^{bc}$ | $5.1 \pm 0.84^{bc}$ | $5.2 \pm 0.28^{c}$ |

LPS, a treatment with each sample prepared at various concentrations was carried out. Cells were cultured for 24 hours. Then, content of pro-inflammatory cytokines in the supernatant obtained after culture was measured. ELISA kit was used for the quantification. $R^2$ value of the standard curve for standards was 0.99 or higher.

11) Measurement of Production Amount of PGE2

Raw 264.7 cells were inoculated to a 24-well plate such that they are present at $2 \times 10^5$ cells/mL, and then cultured for 24 hours in a 5% $CO_2$ incubator. After 24 hours, the medium was replaced with serum-free DMEM medium followed by a treatment with 1 µg/mL LPS. One hour after the pre-treatment, a treatment with each sample prepared at various concentrations was carried out. Cells were cultured for 24 hours. Then, supernatant of the cells upon completion of the culture was collected and the production amount of PGE2 was measured. With regard to the PGE2 measurement, mouse ELISA (enzyme-linked immnunosorbent assay) kit was used for the quantification. $R^2$ value of the standard curve for standards was 0.99 or higher.

12) Statistical Processing

With the obtained test results, mean value and standard deviation among different test groups were calculated by using SPSS statistical analysis program (SPSS, ver. 16.0, USA). The statistical significance was at the significance level of $p < 0.05$, and the obtained results were examined by Duncan's multiple range test in one-way ANOVA.

Example 1. Selection of Optimum Thickness of Shiitake Mushroom Slice Block Based on Sensory Test Result of the sensory test carried out for shiitake mushroom slices, which have been prepared at various thickness, is given in the following Table 3. The sensory test was carried out, for 30 professional panels, according to 9-point scoring method regarding chewing feeling, color, flavor, Example 2. Selection and Establishment of Strains for Fermentation (1) Sensory Test Result of the sensory test which has been carried out with regard to the umami taste of lactic acid bacteria fermented product of shiitake mushroom by following 5-point scoring method was shown in the following Table 4. Specifically, it was found that more enhanced umami taste is obtained from the lactic acid bacteria fermented product compared to the shiitake mushroom extract. Among the various strains, high preference regarding umami taste was obtained from the fermented product resulting from fermentation with *Pediococcus pentosaceus* JMIL002 strain or *Lactobacillus acidophilus* JMIL001 strain.

TABLE 4

Evaluation of umami taste of plant-based lactic acid bacteria fermented product of shiitake mushroom grown on wood logs using liquid extract of shiitake mushroom grown on wood logs or various bacterial strain types

| Strain type | Shiitake mushroom |
|---|---|
| Liquid extract of shiitake mushroom grown on wood logs | 3.16 |
| *Lactobacillus acidophilus* JMIL001 | 4.54 |
| *Lactobacillus acidophilus* 2 | 3.96 |
| *Pediococcus pentosaceus* ALJ015 | 3.90 |
| *Pediococcus pentosaceus* JMIL002 | 4.38 |
| *Lactobacillus fermentum* JMIL-003, | 4.02 |
| *Lactobacillus sakei* JMIL-004 | 3.82 |
| *Tetragenococcus halophilus* JMIL-005, | 3.60 |
| *Lactobacillus plantarum* ICFPL-001 | 4.08 |
| *Lactobacillus brevis* ICFPL-002, | 3.64 |
| *Leuconostoc mesenteroides* ICFPL-003 | 3.70 |
| *Leuconostoc lactis* ICFPL-004 | 3.66 |

(2) Measurement of pH pH was measured during the fermentation period of a plant-based lactic acid bacteria fermented product of fall shiitake mushroom grown on wood logs, which has been inoculated with *Lactobacillus acidophilus* JMIL001 strain (KCTC 14825BP), *Pediococcus pentosaceus* JMIL002 strain (KCTC 14826BP), *Lactobacillus fermentum* JMIL-003, *Lactobacillus* sakei JMIL-004, *Tetragenococcus halophilus* JMIL-005, *Lactobacillus plantarum* ICFPL-001, *Lactobacillus brevis* ICFPL-002, *Leuconostoc mesenteroides* ICFPL-003, or *Leuconostoc lactis* ICFPL-004, and the results are illustrated in FIG. 1. It was found that more the fermentation progresses, lower the pH is from every test group. In particular, it was found that remarkably lower pH is obtained from the plant-based lactic acid bacteria fermented product of fall shiitake mushroom grown on wood logs which has been inoculated with KCTC 14825BP (*Lactobacillus acidophilus* JMIL001) or KCTC 14826BP (*Pediococcus pentosaceus* JMIL002). It was also found that pH lowered in significant sense is obtained from the plant-based lactic acid bacteria fermented product of fall shiitake mushroom grown on wood logs after the inoculation of *Lactobacillus fermentum* JMIL-003 or *Lactobacillus plantarum* ICFPL-001. Accordingly, in the present study, the above 4 strains found to have well-progressed lactic acid bacteria fermentation were selected as a final strain for fermentation.

total acidity higher in significant sense is obtained from the plant-based lactic acid bacteria fermented product of fall shiitake mushroom grown on wood logs after the inoculation of *Lactobacillus fermentum* JMIL-003 or *Lactobacillus plantarum* ICFPL-001. Accordingly, in the present study, the above 4 strains found to have well-progressed lactic acid bacteria fermentation were selected as a final strain for fermentation.

Example 3. Content of General Components

Content of general components in the liquid extract of shiitake mushroom grown on wood logs (Control), lactic acid bacteria fermented product of shiitake mushroom, and fermented shiitake mushroom sauce of Preparation example 3 is described in the following Table 5. When the lactic acid bacteria fermented product and fermented shiitake mushroom sauce are compared with Control, there was no significant difference in terms of the moisture, ashes, crude lipids, and crude fibers. However, in terms of the crude proteins, a significant increase compared to Control was shown.

TABLE 5

| | Analysis result of general components (%) | | | | | |
|---|---|---|---|---|---|---|
| Category | Moisture | Ashes | Crude proteins | Crude lipids | Crude fibers | Soluble nitrogen-free extract |
| Control | 6.93 ± 1.05 | 3.83 ± 0.54 | 18.03 ± 1.26 | 1.56 ± 0.44 | 7.34 ± 0.87 | 62.31 ± 1.06 |
| KCTC 14825BP (*L. acidophilus* JMIL001) | 6.82 ± 1.14 | 3.42 ± 0.69 | 20.65 ± 0.85 | 1.79 ± 0.18 | 7.34 ± 1.05 | 59.98 ± 0.67 |
| KCTC 14826BP (*P. pentosaceus* JMIL002) | 7.12 ± 0.62 | 3.85 ± 0.55 | 19.83 ± 1.1 | 1.73 ± 0.22 | 7.41 ± 0.81 | 60.06 ± 0.89 |
| *L. fermentum* JMIL-003 | 7.69 ± 1.06 | 3.51 ± 0.27 | 18.52 ± 0.69 | 1.39 ± 0.38 | 7.89 ± 0.63 | 61 ± 1.39 |
| *L. plantarum* ICFPL-001 | 7.13 ± 0.97 | 3.28 ± 0.41 | 19.57 ± 1.15 | 1.22 ± 0.14 | 7.26 ± 0.29 | 61.54 ± 1.35 |
| Fermented shiitake mushroom sauce | 7.25 ± 0.54 | 3.48 ± 0.19 | 20.72 ± 1.51 | 1.48 ± 0.3 | 7.19 ± 0.64 | 59.08 ± 1.06 |

(3) Measurement of Total Acidity

Figure 2:
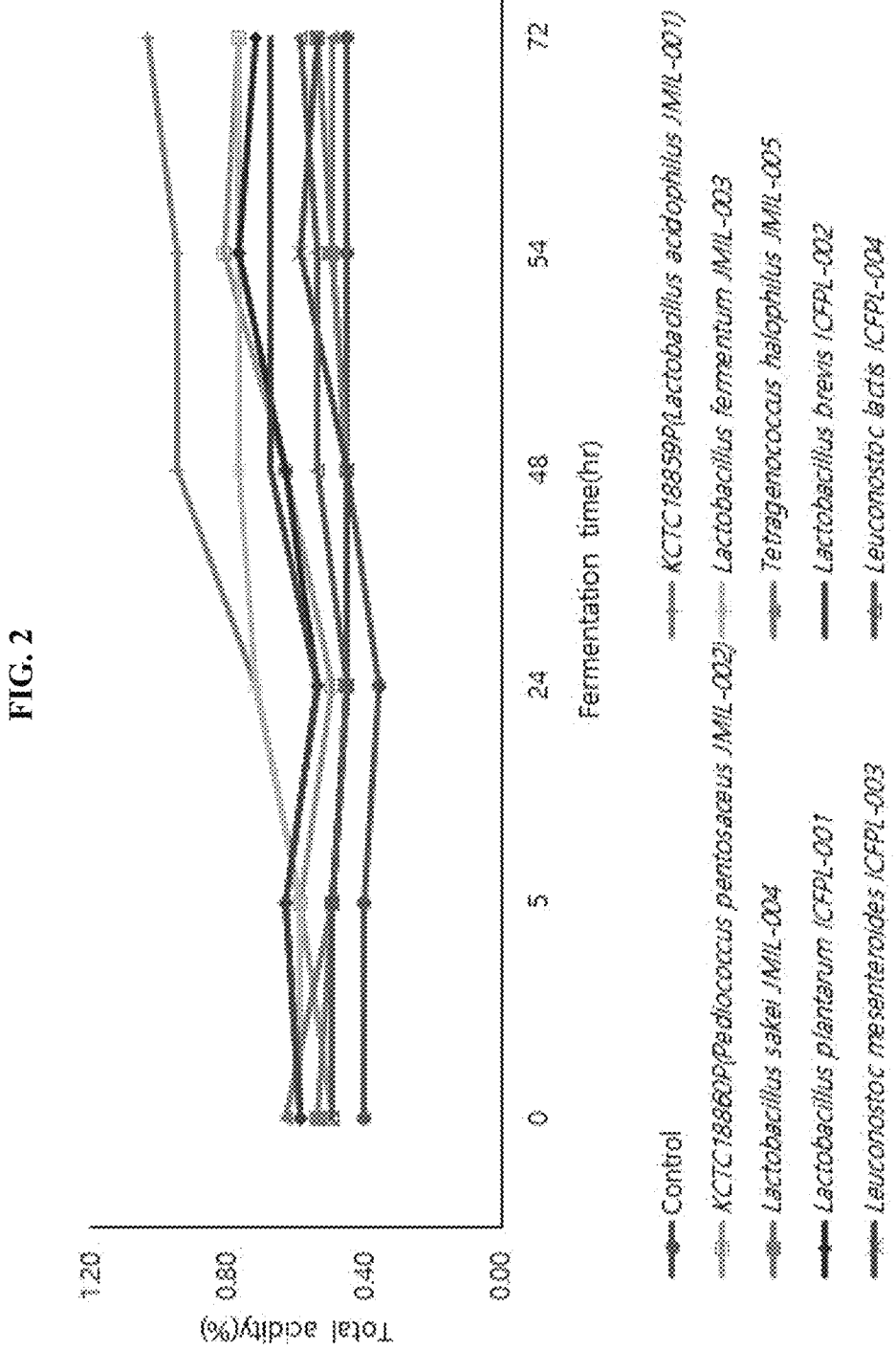
FIG. 2 is a graph for determining a change in total acidity of the fermented product of shiitake mushroom grown on wood logs depending on various bacterial strain types and different fermentation period.

Result of measuring the total acidity during the fermentation period of a plant-based lactic acid bacteria fermented product of fall shiitake mushroom grown on wood logs, which has been inoculated with KCTC 14825BP (*Lactobacillus acidophilus* JMIL001), KCTC 14826BP (*Pediococcus pentosaceus* JMIL002), *Lactobacillus fermentum* JMIL-003, *Lactobacillus* sakei JMIL-004, *Tetragenococcus halophilus* JMIL-005, *Lactobacillus plantarum* ICFPL-001, *Lactobacillus brevis* ICFPL-002, *Leuconostoc mesenteroides* ICFPL-003, or *Leuconostoc lactis* ICFPL-004, are illustrated in FIG. 2. It was found that remarkably high total acidity is obtained from the plant-based lactic acid bacteria fermented product of fall shiitake mushroom grown on wood logs which has been inoculated with KCTC 14825BP (*Lactobacillus acidophilus* JMIL001) or KCTC 14826BP (*Pediococcus pentosaceus* JMIL002). It was also found that

Example 4. Content of Free Sugar

Content of free sugar in the lactic acid bacteria fermented product or fermented shiitake mushroom sauce is described in the following Table 6. As a control for the lactic acid bacteria fermented product and sauce, liquid extract of shiitake mushroom grown on wood logs was used. From the liquid extract of shiitake mushroom grown on wood logs as a control, total 3 types of free sugar, i.e., arabinose, glucose, and fructose, were detected, while the lactic acid bacteria fermented product and fermented shiitake mushroom sauce were found to further contain sucrose. Compared to Control, there was a significant decrease in glucose and fructose in the fermented product and sauce while sucrose was newly detected. In this regard, it is believed that reduced sugar was utilized during the fermentation as a carbon source by the microorganism.

TABLE 6

| | Analysis result of free sugar (%) | | | | |
|---|---|---|---|---|---|
| Category | Arabinose | Glucose | Fructose | Sucrose | Total |
| Control | 5.58 ± 1.09 | 3.04 ± 0.27 | 0.79 ± 0.15 | — | 9.41 ± 1.16 |
| KCTC 14825BP (*L. acidophilus* JMIL001) | 5.59 ± 0.77 | 0.71 ± 0.19 | 0.25 ± 0.26 | 2.37 ± 0.58 | 8.92 ± 0.81 |

TABLE 6-continued

| | Analysis result of free sugar (%) | | | | |
|---|---|---|---|---|---|
| Category | Arabinose | Glucose | Fructose | Sucrose | Total |
| KCTC 14826BP (*P. pentosaceus* JMIL002) | 5.75 ± 0.81 | 0.94 ± 0.33 | 0.32 ± 0.09 | 1.93 ± 0.35 | 8.94 ± 0.69 |
| L. fermentum JMIL-003 | 5.62 ± 0.26 | 1.28 ± 0.23 | 0.45 ± 0.04 | 1.68 ± 0.41 | 9.03 ± 1.09 |
| *L. plantarum* ICFPL-001 | 5.71 ± 0.62 | 1.19 ± 0.16 | 0.42 ± 0.13 | 1.54 ± 0.77 | 8.86 ± 0.94 |
| Fermented shiitake mushroom sauce | 5.44 ± 0.91 | 0.89 ± 0.15 | 0.28 ± 0.22 | 2.62 ± 0.68 | 9.23 ± 0.84 |

Example 5. Content of β-glucan

Content of β-glucan in the lactic acid bacteria fermented product and fermented shiitake mushroom sauce is described in the following Table 7. As a control for the lactic acid bacteria fermented product and plant-based shiitake mushroom sauce, liquid extract of shiitake mushroom grown on wood logs was used. Shiitake mushroom contains sugars composed of various components, which exhibit an anti-cancer activity, and those sugars have an effect of enhancing the immunity and inhibiting the proliferation of cancer cells. β-Glucan, which is one type of polysaccharides present in large amount in mushroom, is present at 35.46% in Control, 35.94 to 37.27% in the lactic acid bacteria fermented product, and 37.14% in the fermented shiitake mushroom sauce, showing slightly increasing tendency. Based on the following results, it is believed that a fermented product prepared by inoculating lactic acid bacteria to the liquid extract of shiitake mushroom grown on wood logs and also fermented shiitake mushroom sauce using the fermented product exhibit an effect of enhancing the immunity.

TABLE 7

| Content of β-glucan (%) | |
|---|---|
| Category | Content |
| Control | 35.46 ± 1.45 |
| KCTC 14825BP (*L. acidophilus* JMIL001) | 37.27 ± 1.22 |
| KCTC 14826BP (*P. pentosaceus* JMIL002) | 37.03 ± 0.69 |
| *L. fermentum* JMIL-003 | 35.94 ± 0.47 |
| *L. plantarum* ICFPL-001 | 36.82 ± 0.51 |
| Fermented shiitake mushroom sauce | 37.14 ± 1.43 |

Example 6. Content of Ergothioneine

Content of ergothioneine in the lactic acid bacteria fermented product and fermented shiitake mushroom sauce is described in the following Table 8. As a control for the lactic acid bacteria fermented product and fermented shiitake mushroom sauce, liquid extract of shiitake mushroom grown on wood logs was used. When the lactic acid bacteria fermented product and fermented shiitake mushroom sauce prepared in the invention are compared with Control, it was found that there is a significant increase in ergothioneine content compared to Control. Among the fermented products, the content was the highest, i.e., 88.76 mg %, in the plant-based lactic acid bacteria fermented product of shiitake mushroom grown on wood logs, which has been inoculated with KCTC 14825BP (*Lactobacillus acidophilus* JMIL001). The lowest content was shown from *Lactobacillus fermentum* JMIL-003, i.e., 69.45 mg %. Ergothioneine is a compound that is biologically synthesized only in mushrooms, and it is known as a compound having an anti-oxidation activity of inhibiting cell aging. It was found according to the result of the present study that, compared to the known liquid extract of shiitake mushroom grown on wood logs, the lactic acid bacteria fermented product shows a significant increase in ergothioneine content, which exhibits much higher potency than conventional anti-oxidants, and it is also expected to exhibit a very strong anti-oxidation activity.

TABLE 8

| Analysis result of ergothioneine (mg %) | |
|---|---|
| Category | Ergothioneine |
| Control | 49.37 ± 8.69 |
| KCTC 14825BP (*L. acidophilus* JMIL001) | 88.76 ± 10.19 |
| CTC 14826BP (*P. pentosaceus* JMIL002) | 83.42 ± 8.45 |
| *L. fermentum* JMIL-003 | 69.45 ± 4.98 |
| *L. plantarum* ICFPL-001 | 79.15 ± 12.65 |
| Fermented shiitake mushroom sauce | 85.71 ± 4.19 |

Example 7. Content of Ergosterol

Content of ergosterol in the lactic acid bacteria fermented product and fermented shiitake mushroom sauce is described in the following Table 9. As a control for the lactic acid bacteria fermented product and fermented shiitake mushroom sauce, liquid extract of shiitake mushroom grown on wood logs was used. Ergosterol is a steroid present in fungi like shiitake mushroom as well as yeast and ergo, and it is also referred to as ergosterin. Once exposed to sunlight, isomerization of the compound occurs as caused by ultra-violet ray to yield vitamin D2, and therefore it is also referred to as provitamin D. Relationship between ergosterol and vitamin D was figured out in 1927, and ergosterol is known to have an effect like alleviating rickets and preventing osteoporosis. When Control is compared with the lactic acid bacteria fermented product and fermented shiitake mushroom sauce, it was found that the content of ergosterol shows, with significant difference, an increase from both the lactic acid bacteria fermented product and fermented shiitake mushroom sauce. Among the fermented products, ergosterol content was the highest in the plant-based lactic acid bacteria fermented product of shiitake mushroom grown on wood logs, which has been inoculated with KCTC 14825BP (*Lactobacillus acidophilus* JMIL001).

TABLE 9

| Analysis result of ergosterol (mg %) | |
|---|---|
| Category | Ergosterol |
| Control | 321.89 ± 19.46 |
| KCTC 14825BP (*L. acidophilus* JMIL001) | 422.63 ± 18.65 |

TABLE 9-continued

| Analysis result of ergosterol (mg %) | |
| --- | --- |
| Category | Ergosterol |
| KCTC 14826BP (*P. pentosaceus* JMIL002) | 407.15 ± 18.65 |
| *L. fermentum* JMIL-003 | 341.24 ± 28.57 |
| *L. plantarum* ICFPL-001 | 383.44 ± 30.5 |
| Fermented shiitake mushroom sauce | 415.06 ± 49.2 |

Example 8. Content of Nucleic Acid-Related Materials

Content of nucleic acid-related materials in the lactic acid bacteria fermented product and fermented shiitake mushroom sauce is described in the following Table 10. As a control for the lactic acid bacteria fermented product and fermented shiitake mushroom sauce, liquid extract of shiitake mushroom grown on wood logs was used. From the fermented shiitake mushroom sauce and all of the lactic acid bacteria fermented products, total 3 types of nucleic acid were found, while all the nucleic acid-related materials were present in less amount when shiitake mushroom grown on wood logs was fermented with lactic acid bacteria. In the fermented shiitake mushroom sauce in which the lactic acid bacterial fermented product is used, total nucleic acid-related materials were found to be the lowest, i.e., 81.87 mg %. It is known that, regarding the nucleic acid-related materials, 5'-GMP present in large amount in shiitake mushroom grown on wood logs exhibits the strongest taste while 5'-XMP is almost tasteless. It is also reported that content of nucleic acid-related materials varies depending on drying method and drying temperature.

TABLE 10

| Content of nucleic acid-related materials (mg %) | | | |
| --- | --- | --- | --- |
| | 5'-AMP[1] | 5'-GMP[1] | 5'-XMP[3] | Total nucleic acid related compounds |
| Control | 29.97 ± 0.21 | 61.35 ± 0.53 | 39.44 ± 0.11 | 130.76 ± 0.64 |
| KCTC 14825BP (*L. acidophilus* JMIL001) | 13.01 ± 0.18 | 29.86 ± 0.47 | 11.12 ± 0.08 | 53.99 ± 0.51 |
| KCTC 14826BP (*P. pentosaceus* JMIL002) | 27.85 ± 0.22 | 49.62 ± 0.15 | 32.31 ± 0.07 | 109.78 ± 0.19 |
| *L. fermentum* JMIL-003 | 24.44 ± 0.16 | 45.01 ± 0.14 | 27.68 ± 0.02 | 97.13 ± 0.59 |
| *L. plantarum* ICFPL-001 | 19.71 ± 0.14 | 35.62 ± 0.28 | 22.01 ± 0.04 | 77.34 ± 0.22 |
| Fermented shiitake mushroom sauce | 21.07 ± 0.11 | 37.69 ± 0.21 | 23.11 ± 0.04 | 81.87 ± 0.2 |

[1] 5'-Adenosine monophosphate 2) 5'-Guanosine monophosphate

[3] 5'-Xanthosine monophosphate

Example 9. Content of Constitutional Amino Acids

Content of constitutional amino acids in the lactic acid bacteria fermented product and fermented shiitake mushroom sauce is described in the following Tables 11 and 12. As a control for the lactic acid bacteria fermented product and fermented shiitake mushroom sauce, liquid extract of shiitake mushroom grown on wood logs was used. Amino acids are a crucial nutrient constituting human body and, to maintain a healthy state of human body, it is required to obtain the amino acids from outside. From both the lactic acid bacteria fermented product and fermented shiitake mushroom sauce, total 16 types of amino acid were detected, and arginine, glutamic acid, and valine appeared to be a major amino acid. When the lactic acid bacteria fermented product and fermented shiitake mushroom sauce prepared in the invention are compared with Control, it was found that there is an increase, with significant difference, in the content of total constitutional amino acids compared to Control. The content was the highest in KCTC 14825BP (*Lactobacillus acidophilus* JMIL001), i.e., 18,465.07 mg %, followed by the fermented shiitake mushroom sauce, i.e., 18,259.44 mg %. In *Lactobacillus fermentum* JMIL-003, total content of constitutional amino acids was the lowest, i.e., 16,738.61 mg %. In the total content, content of 8 components as essential amino acid, i.e., threonine, valine, methionine, lysine, isoleucine, leucine, histidine, and phenylalanine, was found to be between 7,143.34 and 8,122.29 mg %. In particular, KCTC 14825BP (*Lactobacillus acidophilus* JMIL001) exhibited the highest total content ratio of essential amino acids, i.e., 43.99% in the total content of amino acids.

TABLE 11

| Analysis result of constitutional amino acids - 1 (mg %) | | | |
| --- | --- | --- | --- |
| Total amino acids | Control | KCTC 14825BP (*L. acidophilus* JMIL001) | KCTC 14826BP (*P. pentosaceus* JMIL002) |
| Aspartic acid | 520.07 ± 13.62 | 578.51 ± 48.85 | 564.17 ± 76.78 |
| Serine | 1,063.44 ± 13.67 | 1138.59 ± 17.1 | 1109.53 ± 34.02 |
| Glutamic acid | 2,222.43 ± 7.12 | 2456.97 ± 69.14 | 2407.22 ± 79.93 |
| Glycine | 770.22 ± 8.04 | 853.41 ± 75.89 | 835.63 ± 46.44 |
| Histidine | 850.22 ± 29.26 | 913.97 ± 59.94 | 896.21 ± 63.15 |
| Arginine | 3,617.84 ± 91.31 | 3876.15 ± 81.64 | 3824.06 ± 85.71 |
| Threonine | 1,012.61 ± 17.23 | 1281.51 ± 39.09 | 1259.01 ± 50.26 |
| Alanine | 156.32 ± 0.91 | 235.18 ± 0.07 | 217.96 ± 61.31 |
| Proline | 577.77 ± 5.14 | 670.1 ± 16.09 | 643.28 ± 5.12 |
| Tyrosine | 389.57 ± 19.04 | 533.87 ± 71.6 | 518.65 ± 8.19 |
| Valine | 1,213.95 ± 8.07 | 1423.79 ± 65.29 | 1387.56 ± 56.57 |
| Methionine | 222.34 ± 18.75 | 311.34 ± 99.51 | 298.36 ± 14.75 |
| Lysine | 522.47 ± 57.86 | 637.4 ± 20.41 | 622.54 ± 0.49 |
| Isoleucine | 951.10 ± 17.20 | 1123.17 ± 40.76 | 1108.68 ± 4.05 |
| Leucine | 998.12 ± 15.60 | 1185.26 ± 23.9 | 1151.16 ± 47.51 |
| Phenylalanine | 1,057.02 ± 67.88 | 1245.85 ± 7.71 | 1211.43 ± 43.88 |
| TAA[1] | 16,145.49 ± 120.30 | 18465.07 ± 75.86 | 18055.45 ± 99.6 |
| EAA[2] | 6,827.83 ± 31.13 | 8122.29 ± 56.83 | 7934.95 ± 88.09 |
| EAA/TAA (%)[3] | 42.29 ± 0.12 | 43.99 ± 1.05 | 43.95 ± 0.38 |

[1]TAA, total amino acid

[2]EAA, essential amino acid (Thr + Val + Met + Ile + Leu ± His + Lys)

[3]EAA/TAA (%), essential amino acid/total amino acid

TABLE 12

| Analysis result of constitutional amino acids - 2 (mg %) | | | |
| --- | --- | --- | --- |
| Total amino acids | *L. fermentum* JMIL-003 | *L. plantarum* ICFPL-001 | Fermented shiitake mushroom sauce |
| Aspartic acid | 526.17 ± 14.44 | 560.15 ± 33.74 | 584.14 ± 28.64 |
| Serine | 1070.58 ± 41 | 1094.62 ± 43.35 | 1144.08 ± 39.96 |
| Glutamic acid | 2286.73 ± 21.7 | 2394.33 ± 54.6 | 2439.45 ± 103.48 |
| Glycine | 806.66 ± 84.8 | 829.74 ± 31.22 | 830.29 ± 56.71 |
| Histidine | 859.12 ± 95.66 | 890.09 ± 42.96 | 876.35 ± 62.19 |
| Arginine | 3694.05 ± 61.52 | 3781.49 ± 98.7 | 3864.36 ± 34.22 |
| Threonine | 1102.24 ± 49.29 | 1203.73 ± 58.57 | 1256.9 ± 48.63 |
| Alanine | 171.39 ± 1.22 | 204.13 ± 23.74 | 224.83 ± 14.25 |
| Proline | 601.7 ± 89.35 | 638.35 ± 84.91 | 656.74 ± 19.73 |
| Tyrosine | 437.99 ± 80.58 | 511.83 ± 5.42 | 527.11 ± 28.73 |
| Valine | 1265.45 ± 44.48 | 1365.69 ± 26.07 | 1413.26 ± 36.91 |
| Methionine | 234.83 ± 86.52 | 285.11 ± 18.9 | 308.95 ± 10.76 |
| Lysine | 543.27 ± 17.84 | 608.92 ± 16.54 | 620.17 ± 31.46 |
| Isoleucine | 996.54 ± 91.93 | 1078.96 ± 1.85 | 1128.32 ± 48.79 |
| Leucine | 1048.51 ± 0.85 | 1128.54 ± 68.28 | 1146.93 ± 73.91 |
| Phenylalanine | 1093.38 ± 98.29 | 1191.05 ± 88.66 | 1237.56 ± 93.71 |

TABLE 12-continued

| Analysis result of constitutional amino acids - 2 (mg %) | | | |
|---|---|---|---|
| Total amino acids | L. fermentum JMIL-003 | L. plantarum ICFPL-001 | Fermented shiitake mushroom sauce |
| TAA[1] | 16,738.61 ± 36.59 | 17,766.73 ± 68.17 | 18,259.44 ± 132.08 |
| EAA[2] | 7143.34 ± 83.38 | 7752.09 ± 89.74 | 7988.44 ± 46.36 |
| EAA/TAA (%)[3] | 42.68 ± 0.98 | 43.63 ± 1.13 | 43.75 ± 1.68 |

[1]TAA, total amino acid
[2]EAA, essential amino acid (Thr + Val + Met + Ile + Leu + His + Lys)
[3]EAA/TAA (%), essential amino acid/total amino acid

Example 10. Content of Free Amino Acids

Content of free amino acids in the lactic acid bacteria fermented product and fermented shiitake mushroom sauce is described in the following Tables 13 and 14. As a control for the lactic acid bacteria fermented product and fermented shiitake mushroom sauce, liquid extract of shiitake mushroom grown on wood logs was used. From both the lactic acid bacteria fermented product and fermented shiitake mushroom sauce, total 16 types of free amino acid were found, and histidine, glutamic acid, and arginine appeared to be a major amino acid. The content of free amino acids was the highest in KCTC 14825BP (*Lactobacillus acidophilus* JMIL001), i.e., 3,786.65 mg %, followed by the fermented shiitake mushroom sauce, i.e., 3,679.54 mg %. In *Lactobacillus fermentum* JMIL-003, total content of constitutional amino acids was the lowest, i.e., 2,824.83 mg %. In the total content, content of 8 components as essential amino acid, i.e., threonine, valine, methionine, lysine, isoleucine, leucine, histidine, and phenylalanine, was found to be between 1,510.64 and 2,017.32 mg %. As a result of comparing the lactic acid bacteria fermented product with Control in terms of the content of free amino acids, it was found that there is a significant increase in the content in both cases. Taste is generally decided by free amino acids. Aspartic acid and glutamic acid are known as a component exhibiting the umami taste of a fermented product while leucine and isoleucine may exhibit an influence on bitter taste. Based on the result, it is believed that the flavor and taste of a lactic acid bacteria fermented product can be greatly affected by the amino acids present in high amount.

TABLE 13

| Analysis result of free amino acids - 1 (mg %) | | | |
|---|---|---|---|
| Free amino acids | Control | KCTC 14825BP (L. acidophilus JMIL001) | KCTC 14826BP (P. pentosaceus JMIL002) |
| Aspartic acid | 34.98 ± 4.00 | 94.41 ± 2.98 | 92.94 ± 8.4 |
| Serine | 125.99 ± 5.52 | 227.5 ± 8.72 | 220.38 ± 9.97 |
| Glutamic acid | 352.25 ± 43.81 | 504.88 ± 6.97 | 458.9 ± 7.05 |
| Glycine | 54.97 ± 1.92 | 138.98 ± 5.27 | 112.75 ± 7.61 |
| Histidine | 679.99 ± 33.79 | 913.04 ± 3.15 | 898.45 ± 6.98 |
| Arginine | 207.20 ± 4.33 | 343.08 ± 9.48 | 243.05 ± 5.99 |
| Threonine | 121.25 ± 5.42 | 284.48 ± 5.47 | 258.88 ± 3.54 |
| Alanine | 130.30 ± 13.44 | 195.86 ± 3.25 | 178.94 ± 4.59 |
| Proline | 28.84 ± 1.49 | 66.1 ± 3.52 | 65.15 ± 7.87 |
| Tyrosine | 42.52 ± 8.70 | 85.75 ± 1.93 | 83.7 ± 6.57 |
| Valine | 84.06 ± 2.52 | 148.24 ± 9.7 | 145.4 ± 8.57 |
| Methionine | 17.90 ± 1.17 | 98.67 ± 12.97 | 86.3 ± 16.98 |
| Lysine | 125.43 ± 11.66 | 215.68 ± 5.36 | 186.2 ± 6.22 |
| Isoleucine | 53.30 ± 0.50 | 112.77 ± 7.59 | 111.34 ± 6.98 |
| Leucine | 83.39 ± 1.02 | 149.07 ± 1.05 | 117.32 ± 2.65 |
| Phenylalanine | 100.80 ± 4.05 | 208.14 ± 4.59 | 196.73 ± 5.39 |

TABLE 13-continued

| Analysis result of free amino acids - 1 (mg %) | | | |
|---|---|---|---|
| Free amino acids | Control | KCTC 14825BP (L. acidophilus JMIL001) | KCTC 14826BP (P. pentosaceus JMIL002) |
| TAA[1] | 2,243.16 ± 129.86 | 3,786.65 ± 132.94 | 3,456.50 ± 173.28 |
| EAA[2] | 1,266.12 ± 46.65 | 2,017.3 ± 80.98 | 1,889.35 ± 69.34 |
| EAA/TAA (%)[3] | 56.48 ± 1.19 | 53.27 ± 1.75 | 54.66 ± 0.32 |

[1]TAA, total amino acid.
[2]EAA, essential amino acid (Thr + Val + Met + Ile + Leu + His + Lys).
[3]EAA/TAA (%), essential amino acid/total amino acid.

TABLE 14

| Analysis result of free amino acids - 2 (mg %) | | | |
|---|---|---|---|
| Free amino acids | L. fermentum JMIL-003 | L. plantarum ICFPL-001 | Fermented shiitake mushroom sauce |
| Aspartic acid | 68.15 ± 3.87 | 77.37 ± 7.35 | 91.37 ± 19.19 |
| Serine | 188.62 ± 6.23 | 206.76 ± 9.09 | 230.1 ± 36.48 |
| Glutamic acid | 405.6 ± 8.4 | 431.09 ± 2.77 | 491.28 ± 51.56 |
| Glycine | 88.62 ± 4.3 | 104.8 ± 10.18 | 127.44 ± 10.24 |
| Histidine | 778.07 ± 8.95 | 819.47 ± 3.58 | 915.43 ± 67.49 |
| Arginine | 223.24 ± 9.53 | 240.18 ± 9.33 | 326.31 ± 20.12 |
| Threonine | 188.02 ± 10.81 | 202.31 ± 2.14 | 270.55 ± 34.25 |
| Alanine | 163.79 ± 10.98 | 179.54 ± 3.18 | 187.68 ± 19.63 |
| Proline | 41.08 ± 3.85 | 60.16 ± 9.32 | 63.72 ± 8.09 |
| Tyrosine | 53.38 ± 4.1 | 63.75 ± 5.41 | 84.94 ± 11.77 |
| Valine | 93.67 ± 6.83 | 128.224.75 | 146.74 ± 21.06 |
| Methionine | 50.64 ± 1.89 | 65.36 ± 22.72 | 90.66 ± 8.6 |
| Lysine | 147.15 ± 20.84 | 178.9 ± 12.72 | 201.08 ± 13.25 |
| Isoleucine | 81.71 ± 1.32 | 99.41 ± 8.81 | 110.17 ± 9.63 |
| Leucine | 102.99 ± 8.85 | 115.42 ± 0.45 | 136.68 ± 17.52 |
| Phenylalanine | 150.1 ± 12.84 | 153.74 ± 5.86 | 205.39 ± 22.73 |
| TAA[1] | 2,824. ± 130.08 | 3,126.48 ± 82.76 | 3679.54 ± 104.24 |
| EAA[2] | 1,510.64 ± 77.9 | 1,663.42 ± 80.79 | 2076.7 ± 71.23 |
| EAA/TAA (%)[3] | 53.48 ± 4.1 | 53.20 ± 7.73 | 56.44 ± 2.06 |

[1] TAA, total amino acid.
[2] EAA. essential amino acid (Thr + Val + Met + Ile + Leu + His + Lys).
[3] EAA/TAA (%), essential amino acid/total amino acid.

Figure 3:
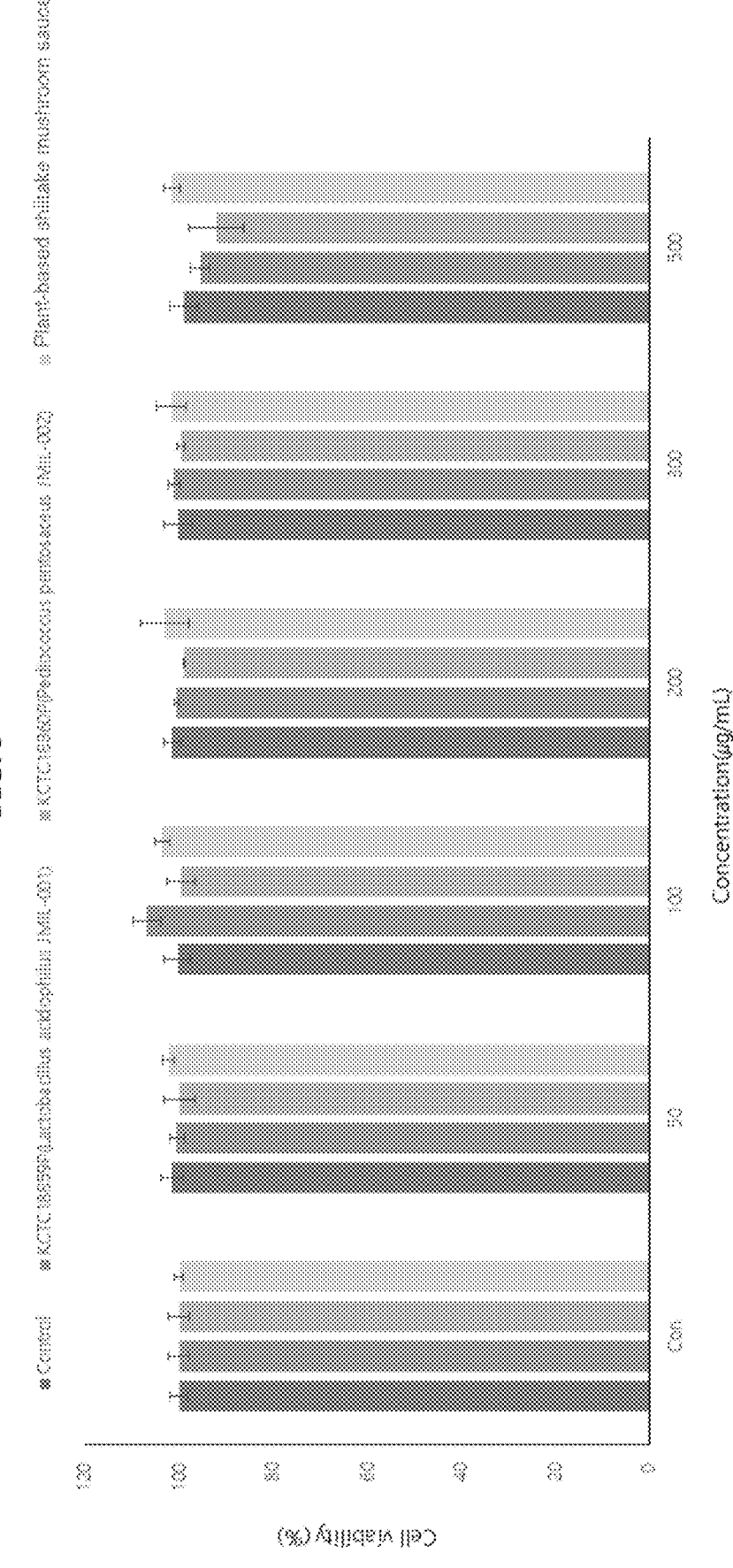
FIG. 3 is a graph for comparing cell cytotoxicity of the liquid extract of shiitake mushroom grown on wood logs (Control, Preparation example 1), fermented product of shiitake mushroom grown on wood logs (KCTC 14826BP, KCTC 14825BP, Preparation example 2), and fermented shiitake mushroom sauce (Preparation example 3) to Raw 264.7 cells, in which the test samples have been prepared at various concentrations.

Example 11. Result of Cell Cytotoxicity Analysis 1-1) Result of Cell Cytotoxicity Analysis for Raw 264.7 Cells To determine the cell cytotoxicity for Raw 264.7 cells as mouse macrophage cell, MTT assay was carried out. Results of analyzing cell cytotoxicity of the liquid extract of shiitake mushroom grown on wood logs, fermented product of KCTC 14825BP (*Lactobacillus acidophilus* JMIL001), fermented product of KCTC 14826BP (*Pediococcus pentosaceus* JMIL002), and fermented shiitake mushroom sauce on Raw 264.7 cells are the same as those illustrated in FIG. 3. As a result of determining the cell cytotoxicity at various concentrations of 50, 100, 200, 300, and 500 μg/mL, it was found that no cell cytotoxicity is exhibited with any sample at any concentration.

1-2) Result of Cell Cytotoxicity Analysis for RBL-2H3 Cells

Figure 4:
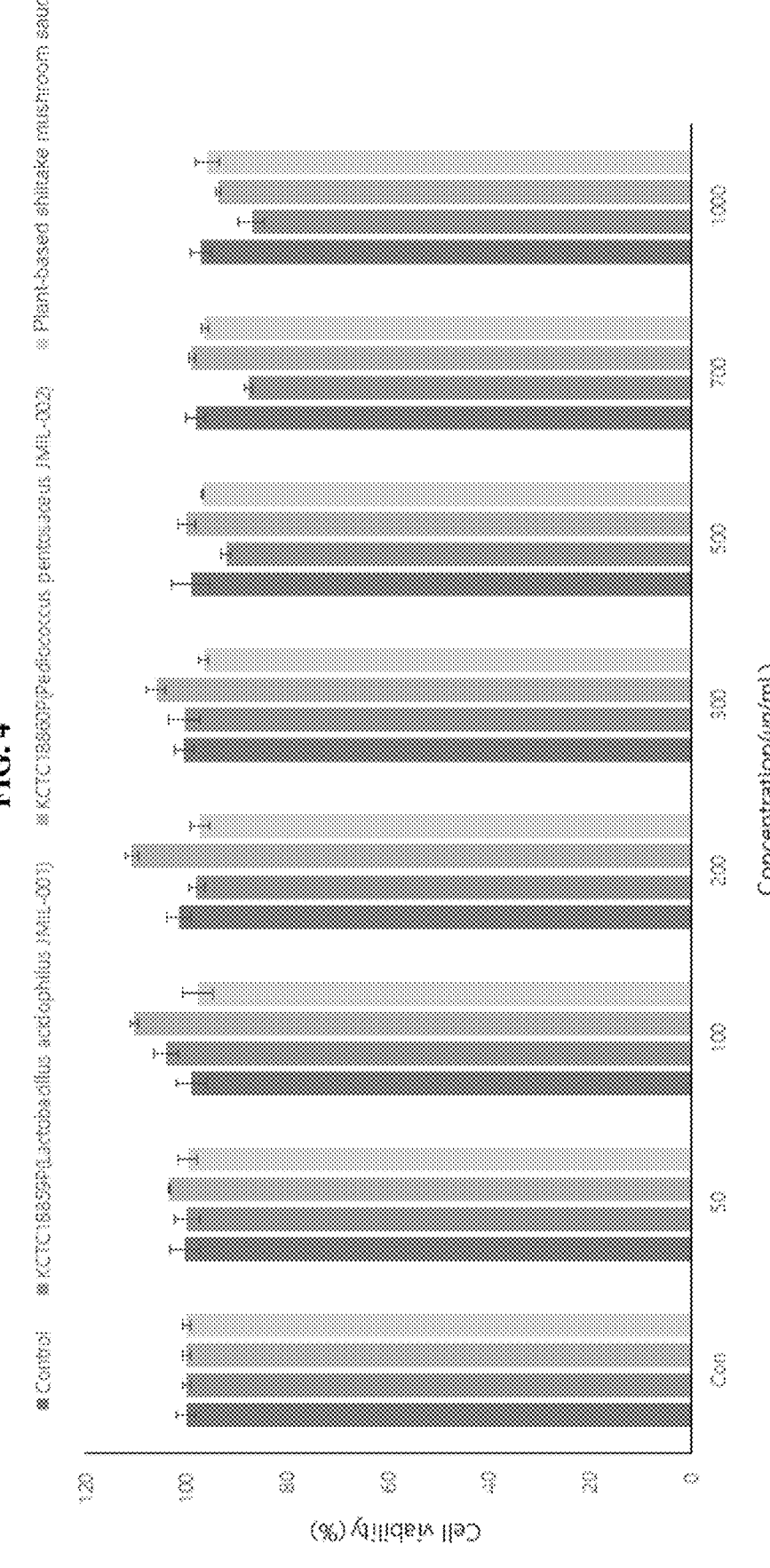
FIG. 4 is a graph for comparing cell cytotoxicity of the liquid extract of shiitake mushroom grown on wood logs (Control, Preparation example 1), fermented product of shiitake mushroom grown on wood logs (KCTC 14826BP, KCTC 14825BP, Preparation example 2), and fermented shiitake mushroom sauce (Preparation example 3) to RBL-2H3 cells, in which the test samples have been prepared at various concentrations.

RBL-2H3 cells as a mast cell are present in large area of human body including skin, respiratory system, and digestive system. Being able to produce many mediator materials capable of inducing inflammation and controlling immune system upon stimulation from outside, it plays a key role in innate immunity and adaptive immunity. Results of analyzing cell cytotoxicity of the liquid extract of shiitake mushroom grown on wood logs, fermented product of KCTC 14825BP (*Lactobacillus acidophilus* JMIL001), fermented product of KCTC 14826BP (*Pediococcus pentosaceus* JMIL002), and fermented shiitake mushroom sauce on RBL-2H3 cells are the same as those illustrated in FIG. 4. It was found that no cell cytotoxicity on RBL-2H3 cells is exhibited with any sample at any concentration.

1-3) Result of Cell Cytotoxicity Analysis for AGS Cells

Figure 5:
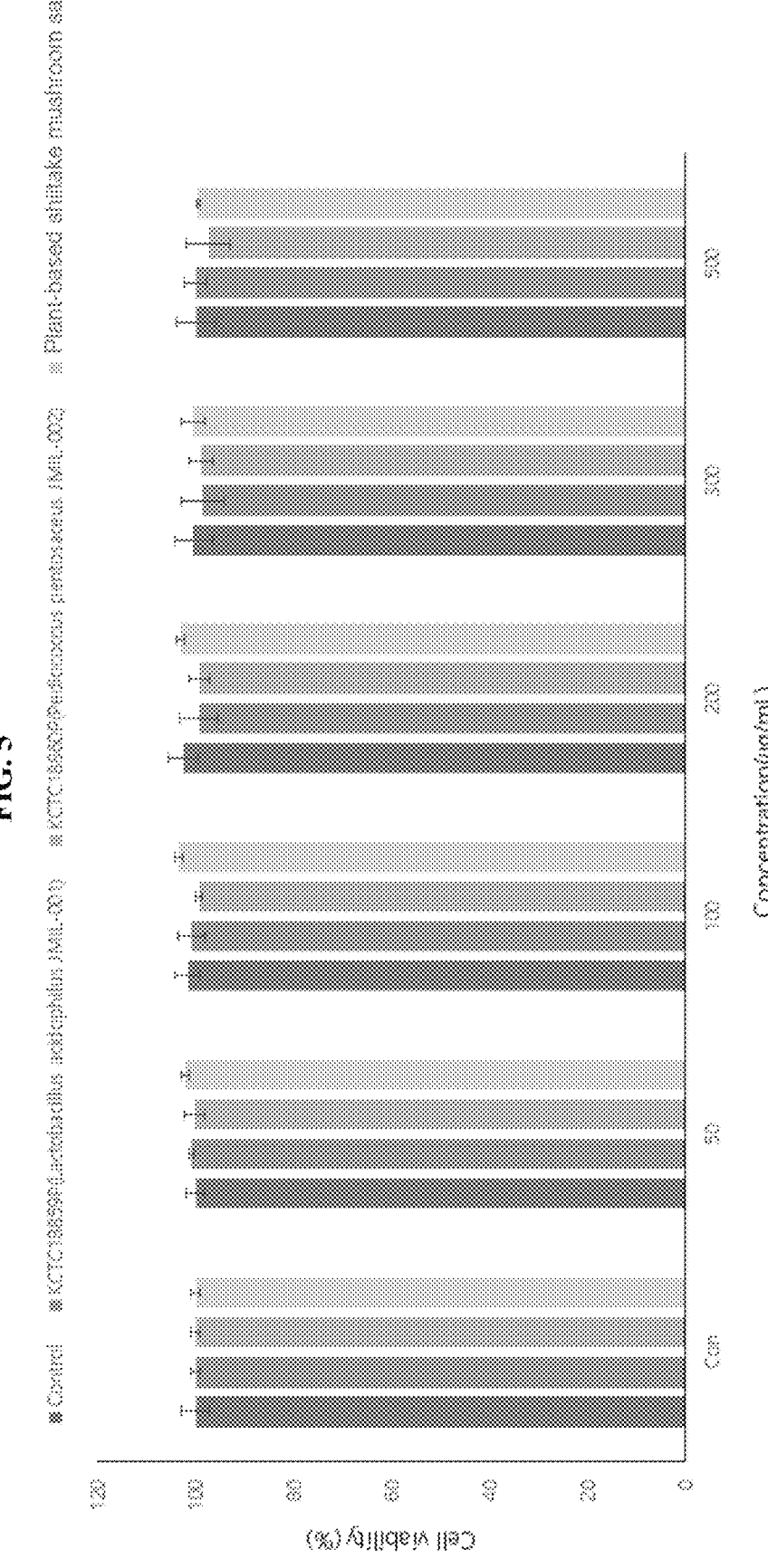
FIG. 5 is a graph for comparing cell cytotoxicity of the liquid extract of shiitake mushroom grown on wood logs (Control, Preparation example 1), fermented product of shiitake mushroom grown on wood logs (KCTC 14826BP, KCTC 14825BP, Preparation example 2), and fermented shiitake mushroom sauce (Preparation example 3) to AGS cells, in which the test samples have been prepared at various concentrations.

Results of analyzing cell cytotoxicity of the liquid extract of shiitake mushroom grown on wood logs, fermented product of KCTC 14825BP (*Lactobacillus acidophilus* JMIL001), fermented product of KCTC 14826BP (*Pediococcus pentosaceus* JMIL002), and fermented shiitake mushroom sauce on AGS cells are the same as those illustrated in FIG. 5. It was found that no cell cytotoxicity on AGS cells is exhibited with any sample.

Example 12. Result of Analyzing Anti-Inflammatory Effect

1) Result of Analyzing NO (Nitric Oxide)-Inhibiting Effect

Figure 6:
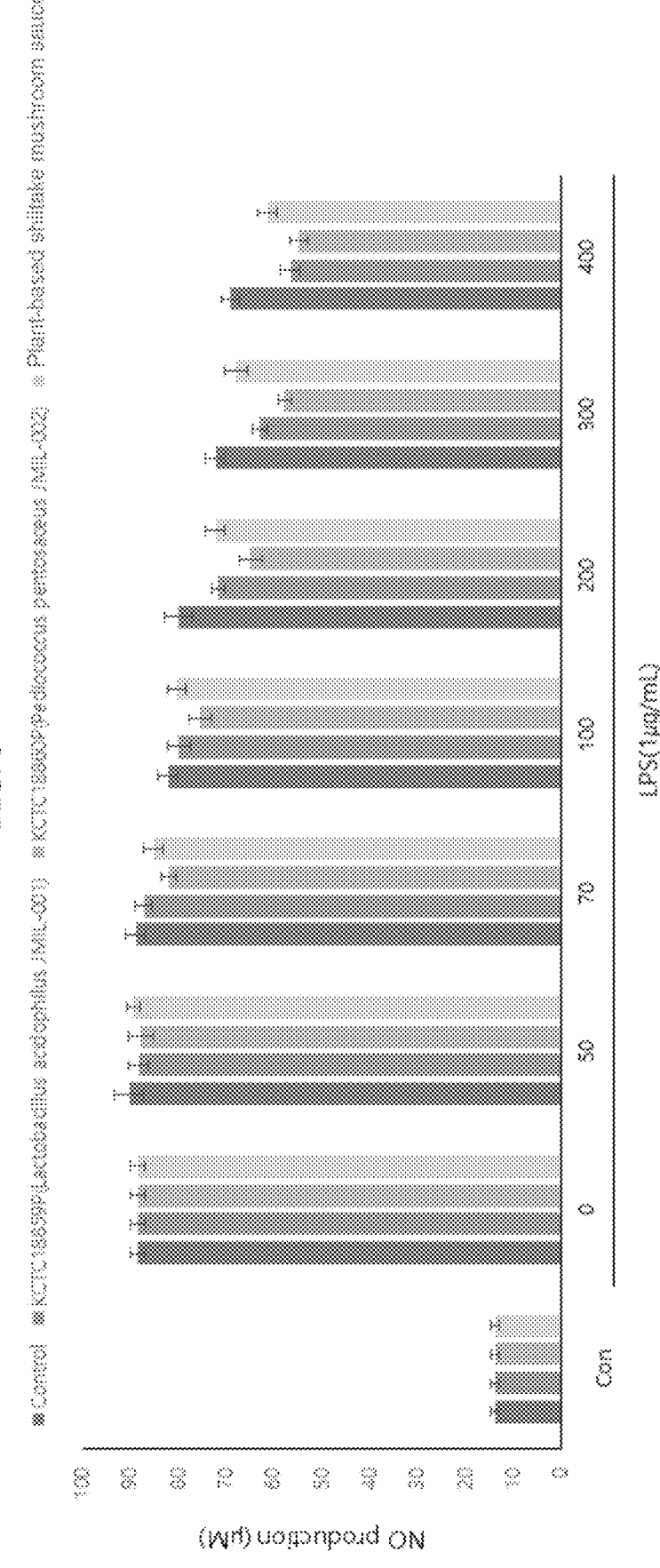
FIG. 6 is a graph for comparing the production amount of NO by the liquid extract of shiitake mushroom grown on wood logs (Control, Preparation example 1), fermented product of shiitake mushroom grown on wood logs (KCTC 14826BP, KCTC 14825BP, Preparation example 2), and fermented shiitake mushroom sauce (Preparation example 3), which have been prepared at various concentrations.

Results of analyzing NO (nitric oxide)-inhibiting effect of the liquid extract of shiitake mushroom grown on wood logs, fermented product of KCTC 14825BP (*Lactobacillus acidophilus* JMIL001), fermented product of KCTC 14826BP (*Pediococcus pentosaceus* JMIL002), and fermented shiitake mushroom sauce are the same as those illustrated in FIG. 6. It was found that production of NO (nitric oxide) is inhibited more by the fermented product compared to the liquid extract.

2) Result of Analyzing IL-1β-Inhibiting Effect

To determine the influence exhibited on the expression of cytokine gene, IL-1B analysis was carried out. Main activity of IL-1 (Interleukin-1) corresponds to the role played as a mediator of the immune response by host, which is shown in response to inflammation and other stimulation. IL-1 is responsible for the key roles of T cells, B cells, macrophages, and the like, and, in particular, it is strongly involved in immune response based on inflammation response.

Figure 7:
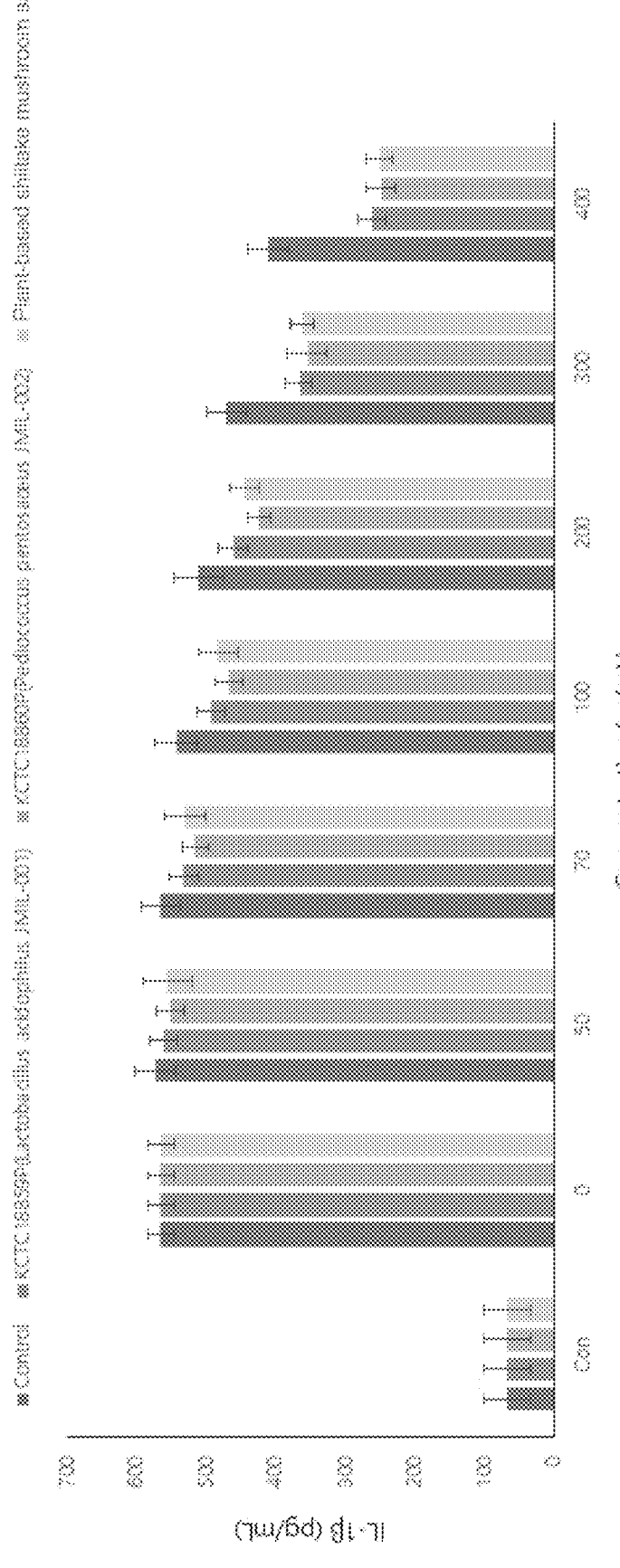
FIG. 7 is a graph for comparing the activity of inhibiting IL-1β by the liquid extract of shiitake mushroom grown on wood logs (Control, Preparation example 1), fermented product of shiitake mushroom grown on wood logs (KCTC 14826BP, KCTC 14825BP, Preparation example 2), and fermented shiitake mushroom sauce (Preparation example 3), which have been prepared at various concentrations.

Results of analyzing IL-1β-inhibiting effect of the liquid extract of shiitake mushroom grown on wood logs, fermented product of KCTC 14825BP (*Lactobacillus acidophilus* JMIL001), fermented product of KCTC 14826BP (*Pediococcus pentosaceus* JMIL002), and fermented shiitake mushroom sauce are the same as those illustrated in FIG. 7. It was found that, when compared to the liquid extract of shiitake mushroom grown on wood logs, production of IL-1B is lower in the fermented product of shiitake mushroom grown on wood logs and also in the fermented shiitake mushroom sauce.

3) Result of Analyzing TNF-α-Inhibiting Effect

Figure 8:
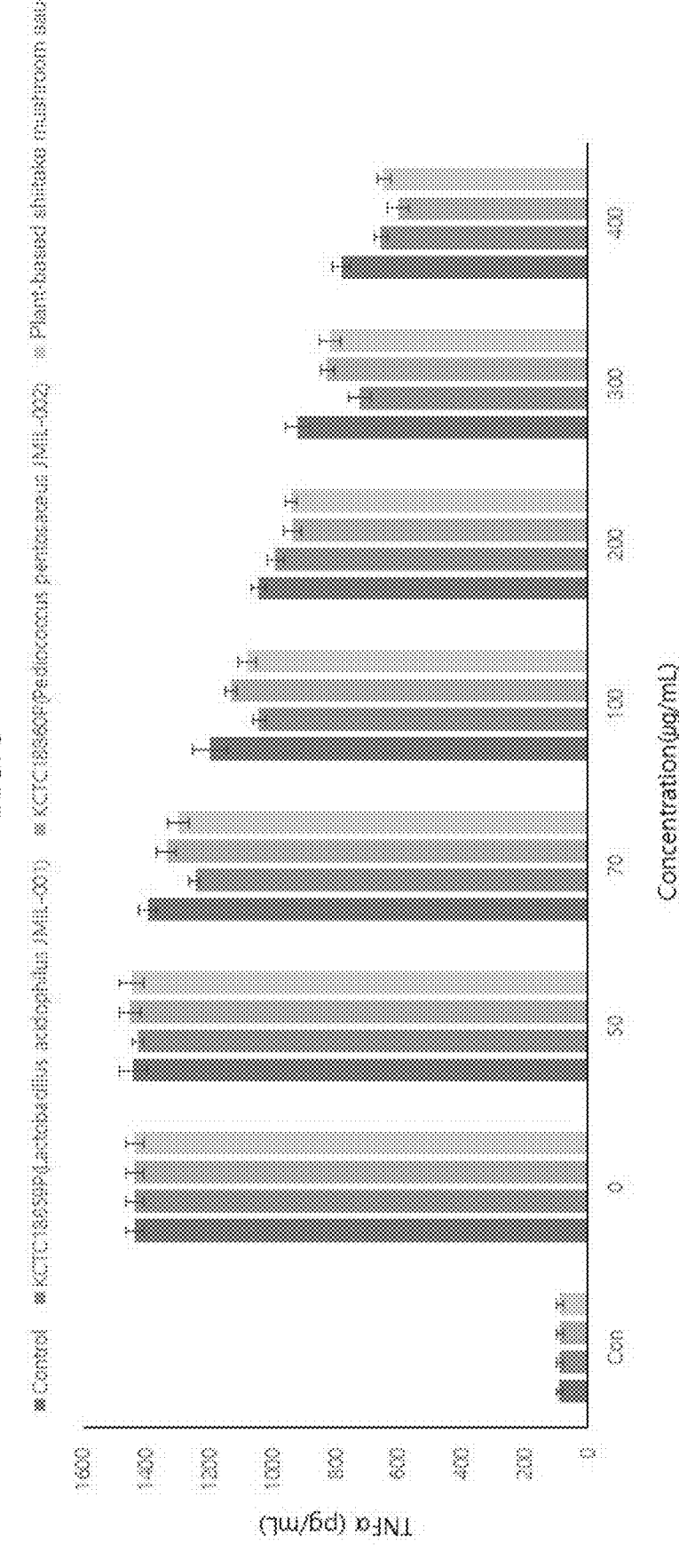
FIG. 8 is a graph for comparing the activity of inhibiting TNF-α by the liquid extract of shiitake mushroom grown on wood logs (Control, Preparation example 1), fermented product of shiitake mushroom grown on wood logs (KCTC 14826BP, KCTC 14825BP, Preparation example 2), and fermented shiitake mushroom sauce (Preparation example 3), which have been prepared at various concentrations.

Results of analyzing TNF-α-inhibiting effect of the liquid extract of shiitake mushroom grown on wood logs, fermented product of KCTC 14825BP (*Lactobacillus acidophilus* JMIL001), fermented product of KCTC 14826BP (*Pediococcus pentosaceus* JMIL002), and fermented shiitake mushroom sauce are the same as those illustrated in FIG. 8. It was found that the highest production of TNF-α is obtained from the liquid extract of shiitake mushroom grown on wood logs, and, compared to the liquid extract, production of TNF-α is inhibited more in the fermented product and also in the fermented shiitake mushroom sauce.

4) Result of Analyzing PGE2-Inhibiting Effect

Figure 9:
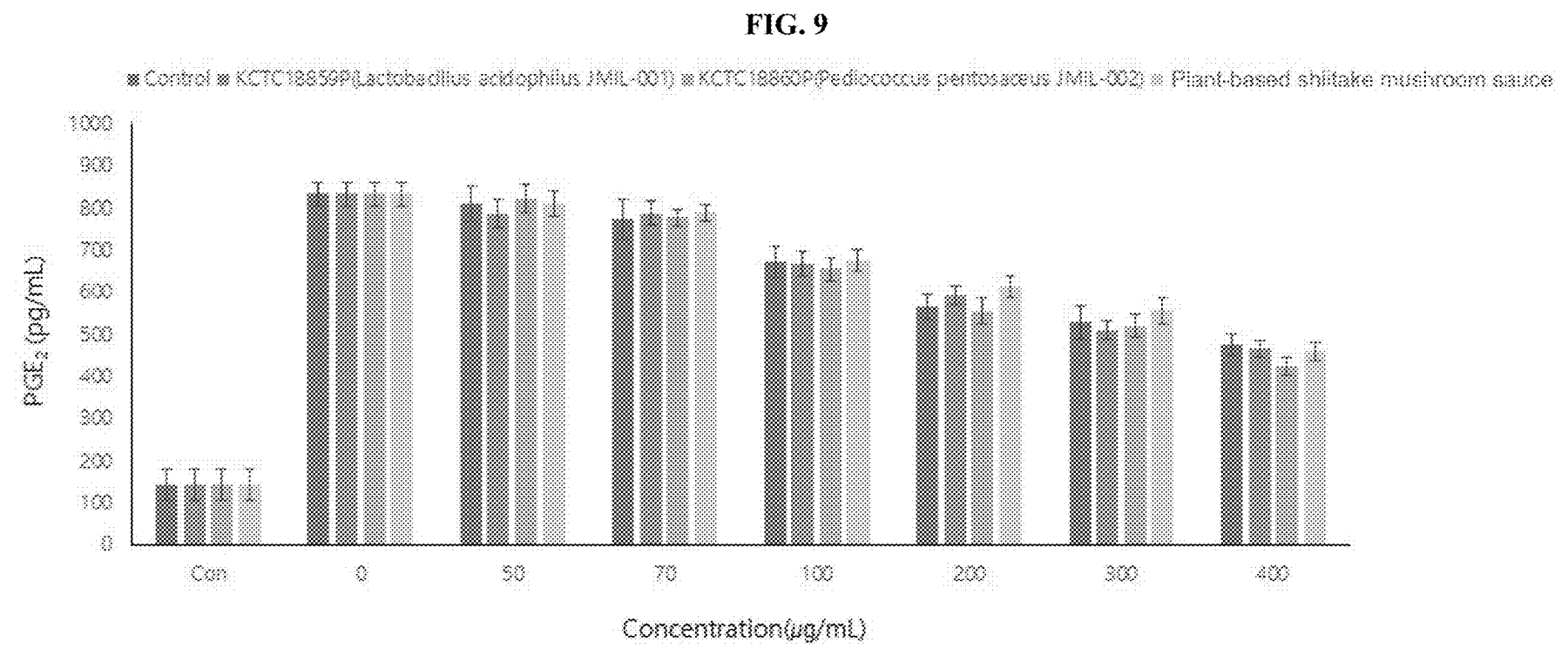

Results of analyzing PGE2-inhibiting effect of the liquid extract of shiitake mushroom grown on wood logs, fermented product of KCTC 14825BP (*Lactobacillus acidophilus* JMIL001), fermented product of KCTC 14826BP (*Pediococcus pentosaceus* JMIL002), and fermented shiitake mushroom sauce are the same as those illustrated in FIG. 9. It was found that the lowest production of PGE2 is shown from the fermented product of JMIL002 at concentration of 400 μg/mL.

Example 13. Result of Sensory Test for Sauces Prepared with Various Sauce Blending Ratio For 8 kinds of sauces which have been prepared with various blending ratio of the ingredients of the step (5) for producing the fermented shiitake mushroom sauce of Preparation example 3, a sensory test was carried out. Results of the sensory test carried out after allowing the test panels to eat beef, which has been cooked in shabu-shabu broth and dipped in sauce, are the same as those described in the following Table 15.

TABLE 15

| Blending ratio for plant-based lactic acid bacteria fermented shiitake mushroom sauce (% by weight) | | | | | | | | | |
|---|---|---|---|---|---|---|---|---|---|
| Group | Plant-based lactic acid bacteria fermented product of shiitake grown on wood logs | Hot pepper extract | Garlic extract | Onion extract | Shiitake mushroom block | Purified water | Salt | Lemongrass | Coriander |
| 1 | 10 | 8 | 4 | 6 | 40 | 26 | 3 | 2 | 1 |
| 2 | 15 | 8 | 4 | 6 | 35 | 26 | 3 | 2 | 1 |
| 3 | 20 | 8 | 4 | 6 | 30 | 26 | 3 | 2 | 1 |
| 4 | 25 | 8 | 4 | 6 | 25 | 26 | 3 | 2 | 1 |
| 5 | 30 | 8 | 4 | 6 | 20 | 26 | 3 | 2 | 1 |
| 6 | 35 | 8 | 4 | 6 | 15 | 26 | 3 | 2 | 1 |
| 7 | 40 | 8 | 4 | 6 | 10 | 26 | 3 | 2 | 1 |
| 8 | 45 | 8 | 4 | 6 | 5 | 26 | 3 | 2 | 1 |

As a result, it was found that the test group Nos. 1, 2, and 3, which have low content of the plant-based lactic acid bacteria fermented product of shiitake mushroom grown on wood logs, receive low scores of the sensory test. In terms of specific test group, the test group No. 6, in which 35% of the plant-based lactic acid bacteria fermented product of shiitake mushroom grown on wood logs, 8% of the hot pepper extract, 4% of the garlic extract, 6% of the onion extract, 15% of the shiitake mushroom block, 26% of purified water, 3% of salt, 2% of lemongrass 2%, and 1% of coriander 1% are added, received the highest score of sensory test.

TABLE 16

| Sauce type | Color | Flavor | Taste | Overall preference |
|---|---|---|---|---|
| | | Sensory test of plant-based lactic acid bacteria fermented shiitake mushroom sauce | | |
| 1 | 5.6 | 5.0 | 5.2 | 5.4 |
| 2 | 5.8 | 5.2 | 5.4 | 5.6 |
| 3 | 6.0 | 5.8 | 6.0 | 6.0 |
| 4 | 6.4 | 6.0 | 6.2 | 6.2 |
| 5 | 6.5 | 6.4 | 6.8 | 6.8 |
| 6 | 6.8 | 7.0 | 7.2 | 7.6 |
| 7 | 6.6 | 6.6 | 6.4 | 6.6 |
| 8 | 5.2 | 5.4 | 5.2 | 5.0 |

What is claimed is:

1. A method for producing a fermented shiitake mushroom sauce, the method comprising:

(1) preparing a shiitake mushroom concentrate by adding water to a shiitake mushroom powder, followed by extraction and concentration to prepare;

(2) preparing a lactic acid bacteria fermented product of shiitake mushroom by adding lactose and sucrose to the shiitake mushroom concentrate prepared in step (1), inoculating the shiitake mushroom concentrate to which the lactose and the sucrose are added with a *Pediococcus pentosaceus* strain or a *Lactobacillus acidophilus* strain to prepare an inoculated shiitake mushroom concentrate, and fermenting the inoculated shiitake mushroom concentrate;

(3) preparing a hot pepper extract by adding corn germ oil to a hot pepper powder, followed by extraction, filtration, and heating;

(4) preparing a garlic extract by crushing a garlic, roasting the crushed garlic in olive oil, and filtering the roasted garlic;

(5) preparing an onion extract by crushing an onion and heating the crushed onion in olive oil;

(6) preparing a shiitake mushroom block by cutting a shiitake mushroom to blocks and drying the shiitake mushroom block; and (7) mixing the lactic acid bacteria fermented product of shiitake mushroom prepared in step (2), the hot pepper extract prepared in step (3), the garlic extract prepared in step (4), the onion extract prepared in step (5), and the shiitake mushroom block prepared in step (6) with water, salt, lemongrass, and coriander, wherein the *Pediococcus pentosaceus* strain is *Pediococcus pentosaceus* JMIL002 strain with Accession No. KCTC 14826BP and the *Lactobacillus acidophilus* strain is *Lactobacillus acidophilus* JMIL001 strain with Accession No. KCTC 14825BP.

2. The method according to claim 1, wherein the mixing in step (7) comprises mixing 32 to 38% by weight of lactic acid bacteria fermented product of shiitake mushroom, 7 to 9% by weight of the hot pepper extract, 3.5 to 4.5% by weight of the garlic extract, 5.5 to 6.5% by weight of the onion extract, and 12 to 18% by weight of the shiitake mushroom block with 23 to 29% by weight of water, 2.5 to 3.5% by weight of salt, 1.8 to 2.2% by weight of lemongrass, and 0.8 to 1.2% by weight of coriander, based on total weight of the fermented shiitake mushroom sauce.

3. The method according to claim 2, wherein the fermented shiitake mushroom sauce is produced by:

(1) adding 8 to 12 times (v/w) of water to shiitake mushroom powder followed by extraction for 4 to 6 hours at 75 to 85° C. and concentration to prepare shiitake mushroom concentrate;

(2) adding to the shiitake mushroom concentrate 2.5 to 3.5% lactose and 1.8 to 2.2% sucrose by weight of shiitake mushroom concentrate, followed by inoculation of *Pediococcus pentosaceus* JMIL002 strain (KCTC 14826BP) or *Lactobacillus acidophilus* JMIL001 strain (KCTC 14825BP) and fermentation for 2 to 4 days at 34 to 40° C. to prepare lactic acid bacteria fermented product of shiitake mushroom;

(3) adding corn germ oil in an amount of 4.5 to 5.5 L to 450 to 550 g of hot pepper powder followed by extraction for 15 to 25 minutes at 110 to 130° C., filtration, and heating for 20 to 40 minutes at 95 to 105° C. to prepare hot pepper extract;

(4) adding olive oil in an amount of 450 to 550 mL to crushed garlic obtained by crushing 0.8 to 1.2 kg of garlic followed by roasting for 4 to 6 minutes at 110 to 130° C. and filtration to prepare garlic extract;

(5) adding olive oil in an amount of 3.5 to 4.5 L to crushed onion obtained by crushing 1.5 to 2.5 kg of onion followed by heating for 8 to 12 minutes at 110 to 130° C. to prepare onion extract;

(6) cutting shiitake mushroom to blocks followed by drying for 10 to 14 hours at 55 to 65° C.; and (7) mixing 32 to 38% by weight of the lactic acid bacteria fermented product of shiitake mushroom prepared in step (2), 7 to 9% by weight of the hot pepper extract prepared in step (3), 3.5 to 4.5% by weight of the garlic extract prepared in step (4), 5.5 to 6.5% by weight of the onion extract prepared in step (5), and 12 to 18% by weight of the shiitake mushroom block prepared in step (6) with 23 to 29% by weight of water, 2.5 to 3.5% by weight of salt, 1.8 to 2.2% by weight of lemongrass, and 0.8 to 1.2% by weight of coriander, based on total weight of the fermented shiitake mushroom sauce.

* * * * *